US010764605B2

(12) United States Patent
Hendry et al.

(10) Patent No.: US 10,764,605 B2
(45) Date of Patent: Sep. 1, 2020

(54) INTRA PREDICTION FOR 360-DEGREE VIDEO

(71) Applicant: QUALCOMM Incorporated, San Diego, CA (US)

(72) Inventors: Fnu Hendry, San Diego, CA (US); Geert Van der Auwera, Del Mar, CA (US); Muhammed Zeyd Coban, Carlsbad, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/271,065

(22) Filed: Feb. 8, 2019

(65) Prior Publication Data

US 2019/0253732 A1    Aug. 15, 2019

Related U.S. Application Data

(60) Provisional application No. 62/630,714, filed on Feb. 14, 2018.

(51) Int. Cl.
*H04N 19/597* (2014.01)
*H04N 19/593* (2014.01)
(Continued)

(52) U.S. Cl.
CPC ....... *H04N 19/597* (2014.11); *H04N 5/23238* (2013.01); *H04N 19/105* (2014.11);
(Continued)

(58) Field of Classification Search
CPC .............. H04N 19/597; H04N 19/593; H04N 5/23238; H04N 19/105; H04N 19/176
(Continued)

(56) References Cited

U.S. PATENT DOCUMENTS

2018/0054613 A1\* 2/2018 Lin .................. H04N 19/167
2018/0109810 A1\* 4/2018 Xu ..................... H04N 19/52
(Continued)

FOREIGN PATENT DOCUMENTS

WO    2018009746 A1    1/2018

OTHER PUBLICATIONS

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
(Continued)

*Primary Examiner* — Zaihan Jiang
(74) *Attorney, Agent, or Firm* — Qualcomm Incorporated

(57) ABSTRACT

A video coder may determine reference samples based on a location of a current block of a current picture of the 360-degree video data and a packing arrangement that defines an arrangement of a plurality of regions in the current picture. The current picture is in a projected domain and each respective region of the plurality of regions is a respective face defined by a projection of 360-degree video data. The regions are arranged in the current picture according to the packing arrangement. Based on the location of the current block being at a border of the first region that is adjacent to the second region and there being a discontinuity at the border due to the packing arrangement, the reference samples are samples of the current picture that spatially neighbor the current block in a spherical domain and not in the projected domain.

20 Claims, 17 Drawing Sheets

(51) Int. Cl.
H04N 19/176 (2014.01)
H04N 19/105 (2014.01)
H04N 5/232 (2006.01)
H04N 19/11 (2014.01)
(52) U.S. Cl.
CPC .......... *H04N 19/11* (2014.11); *H04N 19/176* (2014.11); *H04N 19/593* (2014.11)
(58) Field of Classification Search
USPC .................................................. 375/240.12
See application file for complete search history.

(56) References Cited

U.S. PATENT DOCUMENTS

| | | | |
|---|---|---|---|
| 2019/0082183 A1* | 3/2019 | Shih | H04N 19/182 |
| 2019/0166382 A1* | 5/2019 | He | H04N 19/59 |
| 2019/0200023 A1* | 6/2019 | Hanhart | H04N 19/184 |
| 2019/0215532 A1* | 7/2019 | He | H04N 19/172 |
| 2019/0238888 A1* | 8/2019 | Kim | H04N 19/513 |
| 2019/0253624 A1* | 8/2019 | Kim | H04N 5/23238 |
| 2019/0260990 A1* | 8/2019 | Lim | H04N 19/597 |
| 2019/0268599 A1* | 8/2019 | Hannuksela | G03B 37/00 |
| 2019/0281217 A1* | 9/2019 | Kim | H04N 19/119 |

OTHER PUBLICATIONS

Ergen S., "ZigBee/IEEE 802.15.4 Summary", Sep. 10, 2004, 37 pp.
Hanhart P., et al., "InterDigital's Response to the 360° Video Category in Joint Call for Evidence on Video Compression with Capability beyond HEVC," 7 JVET Meeting, Torino, Joint Video Exploration Team of ISO/IEC JTC 1/SC 29/WG11 and ITU-T SG 16, JVET-G0024, Jul. 6, 2017, pp. 1-16, XP030150821, URL: http://phenix.int-evry.fr/jvet/.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/017449—ISA/EPO—dated Mar. 28, 2019.
ITU-T H-223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H261, Line Transmission of Non-Telephone Signals, Video Codec for Audiovisual Services At p×64 kbits, The International Telecommunication Union, Mar. 1993, 29 pp.
ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Skupin R., et al., "Standardization Status of 360 degree Video Coding and Delivery", 2017 IEEE Visual Communications and Image Processing (VCIP), Retrieved from Internet on Feb. 14, 2018, URL: http://iphome.hhi.de/skupin.assets/pdfs/VCIP2017_360_standardisation_status_camready_final.pdf, 4 pp.
Ye Y., et al., "Algorithm Descriptions of Projection Format Conversion and Video Quality Metrics in 360Lib", 5th JVET Meeting, Geneva, Joint Video Exploration Team OF ISO/IEC JTC1/SC 29/WG11 and ITU-T SG 16, JVET-E1003, Feb. 11, 2017, 22 pages, XP030150650, URL: http://phenix.int-evry.fr/jvet/.
Ye Y., et al., "Algorithm descriptions of projection format conversion and video quality metrics in 360Lib Version 8", JVET-L1004, Joint Video Exploration Team (JVET) of ITU-T SG 16 WP 3 and ISO/IEC JTC 1/SC 29/WG 11, 12th Meeting: Macau, CN, Oct. 3-12, 2018, 47 pages.
Bossen F., et al., "JEM Software Manual," Joint Collaborative Team on Video Coding (JCT-VC) of ITU-T SG16 WP3 and ISO/IEC JTC1/SC29/WG11, Document: JCWC-Software Manual, Retrieved on Aug. 3, 2018, pp. 1-29.
Chen J., "Algorithm Description of Joint Exploration Test Model 7 (JEM7)", 119. MPEG Meeting; Jul. 17, 2017-Jul. 21, 2017; Torino; (Motion Picture Expert Group or ISO/IEC JTC1/SC29/WG11), JVET-G1001v1, No. N17055, Oct. 6, 2017, XP030023716, 48 Pages.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
"ClangFormat," accessed on Apr. 2, 2018, accessed from https://clang.llvm.org/docs/ClangFormat.html, pp. 1-4.
"CMAKE AMA (ask Me Anything)," accessed on Apr. 14, 2018, accessed from https://cmake.org/, 7 pp.
He Y., et al., "360Lib Software Manual," Joint Collaborative Team on Video coding (JCT-VC) of ITU-T SG16 WP3 and SO/IEC JTC 1 /SC29/WG11, Document: JVET 360Lib, Software Manual, Nov. 1, 2017, pp. 1-24.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 pp.

* cited by examiner

☐ Current block

⟶ Top reference sample based on current intra prediction (spatial neighbor)

-→ Top reference sample (i.e., sphere spatial neighbor)

INTRA PREDICTION FOR 360-DEGREE VIDEO

This application claims the benefit of U.S. Provisional Patent Application 62/630,714, filed Feb. 14, 2018, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for selecting a reference for intra prediction for 360° video with a cubemap projection (CMP) and its derivative projections such as an Adjusted Cubemap Projection (ACP) and an Equatorial Cylindrical Projection (ECP). As cubemap projection for 360° video may comprise or consist of several discontinuous regions, an existing approach for selecting reference for intra prediction, which typically uses reference samples from an adjacent block above or left or right to a current block, does not work because the reference samples may be in a different region depending on how the faces of the projection are packed/structured.

In one example, this disclosure describes a method of coding 360-degree video data, the method comprising: determining reference samples based on a location of a current block of a current picture of the 360-degree video data and a packing arrangement that defines an arrangement of a plurality of regions in the current picture, wherein: the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain; and generating a prediction block for the current block using intra prediction based on one or more of the determined reference samples.

In another example, this disclosure describes a device for coding 360-degree video data, the device comprising a memory configured to store the 360-degree video data; and one or more processor implemented in circuitry, the one or more processors configured to: determine reference samples based on a location of a current block of a current picture of the 360-degree video data and a packing arrangement that defines an arrangement of a plurality of regions into the current picture, wherein: the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain; and generate a prediction block for the current block using intra prediction based on one or more of the determined reference samples.

In another example, this disclosure describes a device for coding video data, the device comprising: means for determining reference samples based on a location of a current block of a current picture of the 360-degree video data and a packing arrangement that defines an arrangement of a plurality of regions in the current picture, wherein: the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain; and means for generating a prediction block for the current block using intra prediction based on one or more of the determined reference samples.

In another example, this disclosure describes a computer-readable storage medium having stored thereon instructions that, when executed, cause one or more processors to: determine reference samples based on a location of a current block of a current picture of the 360-degree video data and a packing arrangement that defines an arrangement of a plurality of regions into the current picture, wherein: the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain; and generate a prediction block for the current block using intra prediction based on one or more of the determined reference samples.

The details of one or more examples are set forth in the accompanying drawings and the description below. Other features, objects, and advantages will be apparent from the description, drawings, and claims.

Figure 1:
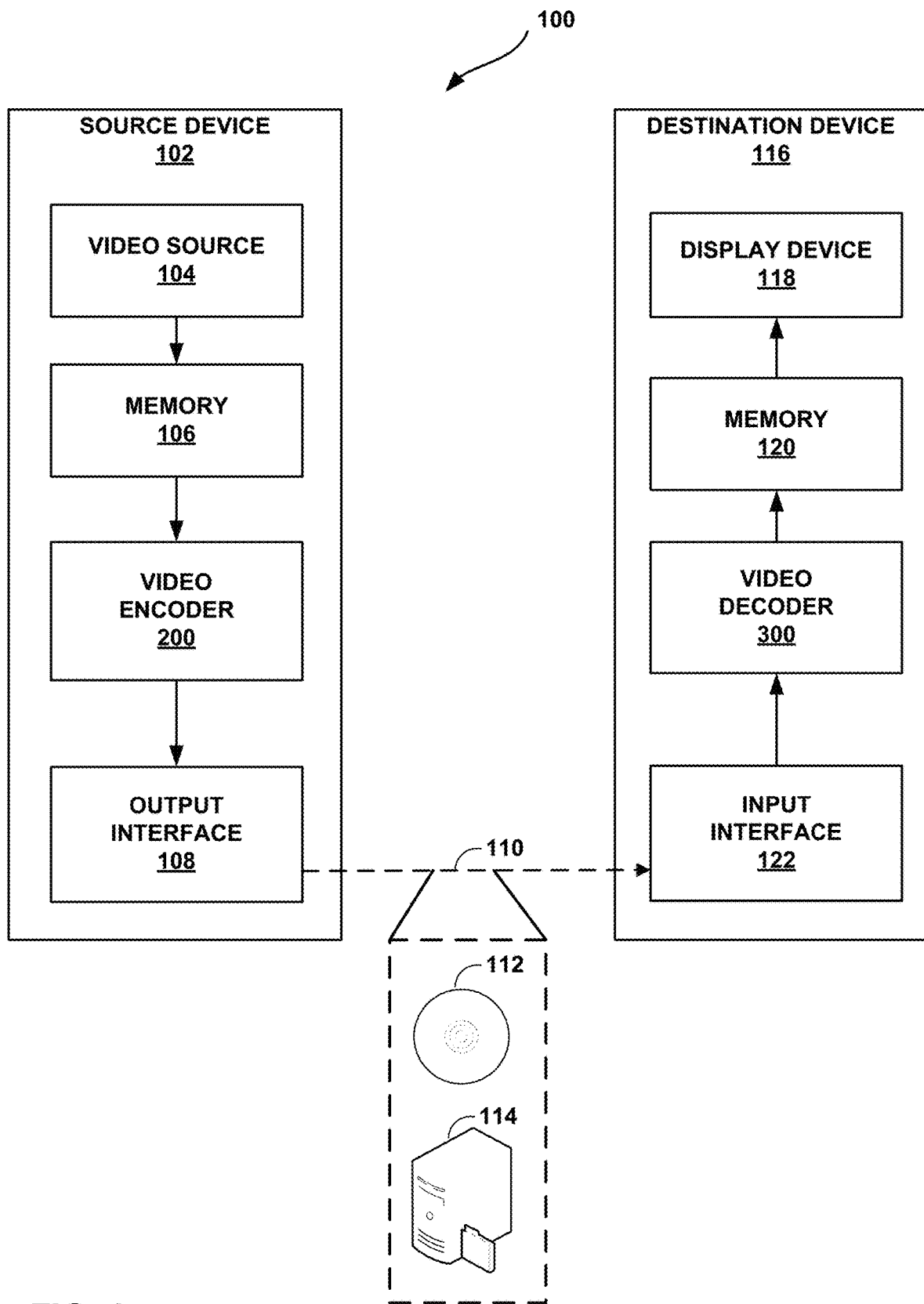
FIG. 1 is a block diagram illustrating an example video encoding and decoding system that may perform the techniques of this disclosure.

DETAILED DESCRIPTION 360-degree video may include video in which, for any time instance, a viewer can potentially see anything visible in a sphere surrounding the viewer. 360-degree video may be applicable in immersive virtual reality (VR) experiences in which a viewer can freely change their direction of view. In 360-degree video, each picture may correspond to the visible content in a 3-dimensional sphere surrounding a viewer.

Video encoding codecs are designed primarily for encoding 2-dimensional images, such as those suitable for display on a conventional television or movie projector. Thus, to adapt 360-degree video of encoding in a video codec, pictures of the 360-degree video are projected into a 2-dimensional domain (i.e., a projected domain). 2-dimensional pictures in the projected domain may then be encoded in the same way as conventional 2-dimensional pictures.

Cubemap projections are a common way to project pictures of 360-degree video into a 2-dimensional domain. In a cubemap projection, a cube is centered on a viewpoint of a viewer. Thus, the cube may have a front face for content in front of the viewer, a right face for content to the right of the viewer, a left face for content to the left of the viewer, a top face for content above the viewer, and a bottom face for content below the viewer. Samples from the 3-dimensional sphere surrounding the viewer are projected onto the faces of the cube. Thus, each face of the cube may comprise a 2-dimensional array of samples. The faces of the cube may themselves be arranged according to a packing arrangement into a 2-dimensional picture. The resulting 2-dimensional picture may then be encoded.

One problem with the use of cubemap projections is that when the faces of the cube are arranged according to the packing arrangement, samples at the border of a first region (i.e., a first face) may spatially neighbor samples of a second region (i.e., a second face) that is not adjacent in the spherical domain. For example, samples on either side of a border between a top region and a left region might not actually be adjacent to one another in the spherical domain. This may limit the utility of analyzing the reference samples across borders between regions. For instance, in the example above, when performing intra prediction of blocks of the top region at the border between the top region and the left region, the samples of the left region on the other side of the border may have little predictive value. The inability to use samples across certain inter-region borders may diminish potential encoding efficiency, resulting in less compression of the video data.

This disclosure describes techniques that may address these issues and potentially increase encoding efficiency. In this disclosure it is appreciated that samples of a first region that are at a border between the first region and a second region may be adjacent, in the spherical domain, to samples that are not on the border between the first region and the second region. For instance, in some packing arrangements of a cubemap projection, samples of the top region at the border between the top region and the left region may be adjacent in the spherical domain to samples at a top border of the left region. Thus, the current picture may contain reference samples for a current block (e.g., samples of the current picture used in encoding a current block of the current picture) that spatially neighbor the current block in the spherical domain but not in the projected domain.

Accordingly, in one example of this disclosure, a video coder (e.g., a video encoder or a video decoder) may determine reference samples based on a location of a current block of a current picture. In this example, the current picture is in a projected domain and comprises a plurality of regions. Each respective region of the plurality of regions is a respective face defined by a projection of 360-degree video data. The projection is a cubemap projection (CMP) or a derivative projection of the CMP. The regions are arranged in the current picture according to a packing arrangement. In other words, the packing arrangement defines an arrangement of a plurality of regions in the current picture. Furthermore, in this example, the video coder may determine the reference samples based on the location of the current block such that the reference samples are samples that spatially neighbor the current block in a spherical domain and not in the projected domain. In this example, the video coder may generate a prediction block for the current block using intra prediction based on one or more of the determined reference samples. For other blocks of the current picture the reference samples may spatially neighbor the other blocks in both the spherical domain and the projected domain.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, broadcast receiver devices, mobile devices, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for selecting reference for intra prediction for 360° video with cubemap projection (CMP) and its derivative projections. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for selecting reference samples for intra prediction for 360° video with cubemap projection (CMP) and its derivative projections. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 112 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream received from computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra prediction information, such as an intra-mode indication.

As another example, video encoder 200 and video decoder 300 may be configured to operate according to JEM or VVC. According to JEM and VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

To achieve more flexible partitioning for a CTU, a mixed transform tree (MTT)-based CU structure is proposed to replace quadtree-, binary tree-, and/or QTBT-based CU structures. The MTT partitioning structure of this disclosure is still a recursive tree structure. However, multiple different partition structures (e.g., three or more) are used. For example, in an MTT partitioning structure, three or more different partition structures may be used at each depth of a tree structure. In this context, the depth of a node in a tree structure may refer to the length of the path (e.g., the number of splits) from the node to the root of the tree structure. As used in this disclosure, a partition structure may generally refer to how many different blocks a block may be divided into. For example, a quad-tree partitioning structure may divide a block into four blocks, a binary-tree partitioning structure may divide a block into two blocks, and a triple-tree partitioning structure may divide a block into three blocks. A partition structure may have multiple different partition types, as will be explained in more detail below. A partition type may additionally define how a block is divided, including symmetric or asymmetric partitioning, uniform or non-uniform partitioning, and/or horizontal or vertical partitioning. Video encoder 200 and video decoder 300 may be configured to use quadtree partitioning per HEVC, QTBT partitioning according to JEM, MTT, or other partitioning structures.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra prediction. Inter prediction generally refers to predicting the CU from data of a previously coded picture, whereas intra prediction generally refers to predicting the CU from previously coded data of the same picture. To perform inter prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra prediction, video encoder 200 may select an intra prediction mode to generate the prediction block. JEM provides sixty-seven intra prediction modes, including various directional modes, as well as planar mode and DC mode. In general, video encoder 200 selects an intra prediction mode that describes neighboring samples to a current block (e.g., a block of a CU) from which to predict samples of the current block. Such samples may be referred to as "reference samples" for intra prediction. The reference samples for intra prediction are generally above, above and to the left, or to the left of the current block in the same picture as the current block, assuming video encoder 200 codes CTUs and CUs in raster scan order (left to right, top to bottom). Reference samples that are in the row of samples above the current block may be referred to herein as above reference samples. Reference samples that are in the column of samples left of the current block may be referred to herein as left reference samples.

A video coder, such as video encoder 200 or video decoder 300, may perform intra prediction using an intra prediction mode selected from a plurality of available intra prediction modes. The intra prediction modes may include non-directional intra prediction modes and directional intra prediction modes, which may also be referred to as intra prediction directions. Different directional intra prediction modes correspond to different angles. In some examples, to determine a value of a current sample of a predictor block using a directional intra prediction mode, the video coder may determine a point where a line passing through the current sample at the angle corresponding to the directional intra prediction mode intersects a set of reference samples. The reference samples may comprise samples in a column immediately left of the predictor block (left reference samples) and samples in a row immediately above the predictor block (above reference samples). If the point is between two of the reference samples, the video coder may interpolate or otherwise determine a value corresponding to the point. If the point corresponds to a single one of the reference samples, the video coder may determine that the value of the point is equal to the reference sample. The video coder may set the value of the current sample of the predictor block equal to the determined value of the point.

Video encoder 200 may encode data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, to adapt 360-degree video to encoding in a video codec, pictures of the 360-degree video may be projected into a 2-dimensional "projected" domain according to a cubemap projection (CMP) or a derivative of the cubemap projection. Regions in a cubemap projection (and its derivatives) are packed into 2-dimensional arrangement such as a 2×3 or 3×4 representation as illustrated in FIGS. 2A, 2B, and 2C.

Figure 2A:
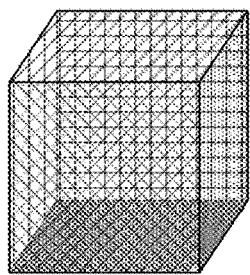
FIGS. 2A, 2B, and 2C illustrate an example cube and example representations of a cubemap in a 2-dimensional frame.

Specifically, FIG. 2A illustrates an example 3-dimensional cube showing the relationships between regions in a cubemap projection. For example, in FIG. 2A, a "front" region is shown in a diagonal cross pattern, a "right" region is shown with a small dot pattern, a "left" region is shown with a vertical line pattern, a "bottom" region is shown with a dense dot pattern, a "back" region is shown with a horizontal/vertical cross pattern, and a "top" region is shown in a diagonal line pattern.

Figure 2B:
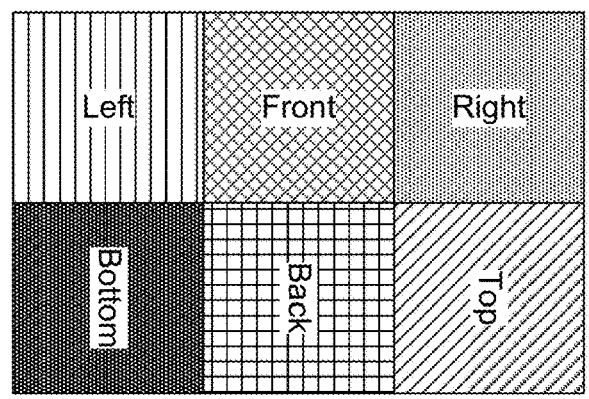
Figure 2C:
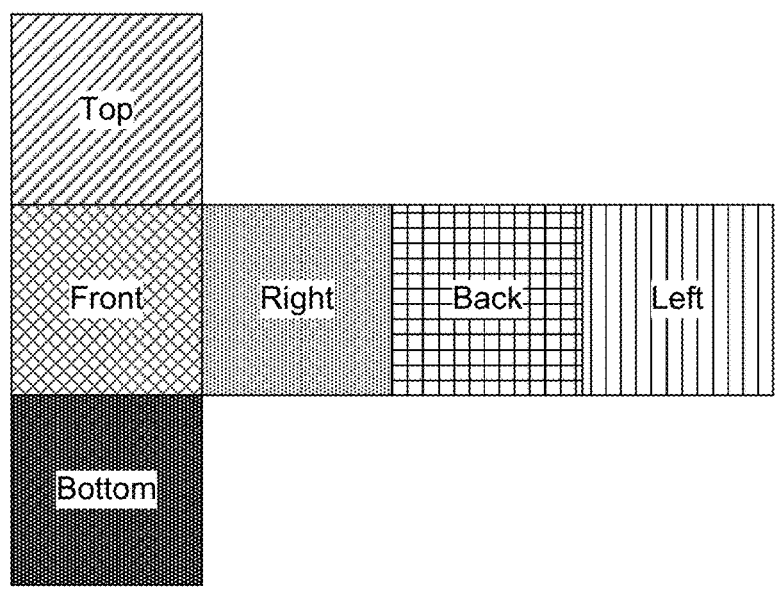

As shown in the example of FIG. 2B, the regions can be arranged according to a packaging arrangement such that the "left," "front," and "right" regions form a top half of a picture and the "bottom," "back," and "top" regions form a bottom half of the picture. In the example of FIG. 2B, the text for the "bottom," "back," and "top" regions is written vertically to indicate that the samples in the "bottom," "back," and "top" regions are scanned into these regions according to an order 90-degrees removed from the order into which samples are scanned into the "left," "front," and "right" regions. For example, the "right" region may correspond to the view that the viewer would have if the user were to turn their head to the right. In this example, when the viewer turns their head to the right, a sample corresponding to top left of the viewer's field of view may be scanned into the top-left of the "right" region and a sample corresponding to the top right of the viewer's field of view may be scanned into the top-right of the "right" region. In this example, the "top" region may correspond to the view that the viewer would have if the user were to turn their head upward. In this example, when the viewer turns their head upward, a sample corresponding to the top-left of the viewer's field of view may be scanned into the top-right corner of the "top" region and a sample corresponding to the top-right of the viewer's field of view may be scanned into the bottom-right corner of the "top" region. FIG. 2C illustrates another example packing arrangement.

Such packing arrangements break picture continuity between faces, which consequently may prevent the use of an intra prediction method that works based on using spatial neighbor samples (e.g., top, left, and/or right samples) as reference to perform optimally. For instance, in the example of FIG. 2B, samples of the "bottom" region along the border with the "left" region are spatially adjacent to one another in the projected domain but are not adjacent in the original spherical domain. Thus, it would be of little benefit to use the samples of the "left" region as reference samples for intra prediction of blocks of the "bottom" region that are along the border between the "bottom" region and the "left" region.

Figure 3:
FIG. 3 illustrates an example compact representation of 360-degree video with a cubemap (CMP) projection.

FIG. 3 illustrates an example compact representation of 360° video with a CMP projection. More specifically, FIG. 3 illustrates an example of 2×3 packing arrangement of a frame with CMP projection. Such an arrangement is an example of 2×3 packing arrangement as illustrated by FIG. 2B. Thus, the left third of the top half of the frame of FIG. 3 is the "left" region and the left third of the bottom half of the frame of FIG. 3 is the "bottom" region. As shown in FIG. 3, there is a discontinuity between the top half of the frame and the bottom half of the frame. Such a discontinuity would affect performance of intra prediction, particularly first row coding blocks of the bottom half of the frame. In contrast, there is less discontinuity between blocks in adjacent regions within the top half of the frame and between blocks in adjacent regions within the bottom half of the frame. Thus, it may still be advantageous to perform intra prediction across borders between regions in the top half of the frame and across borders between regions in the bottom half of the frame.

Intra prediction methods that work based on using spatial neighbor samples as reference cannot perform optimally because of at least two problems. Firstly, correct reference samples for blocks located at the border of a first face may be in a second face that does not spatially neighbor the first face. For example, reference samples for blocks located at the top border of bottom, back and top faces in FIG. 2B are not the samples adjacent to those blocks. Secondly, for 360-degree video, reference samples that are typically not available for utilization of purposes of intra prediction for non-360-degree video may be available for utilization for intra prediction in 360-degree video. For example, the left reference samples for blocks at the left border of the "bottom" face in FIG. 2B are available from the bottom part of the "front" face, the top reference samples for blocks at the top border of the "right" face in FIG. 2C are available from the right part of the "top" face. These reference sample availabilities are specific only to 360° video and are not exploited in the current intra prediction methods.

This disclosure describes techniques that may address these problems and may thereby improve coding efficiency in 360-degree video. The following techniques disclosed in this section may be applied independently and/or in combination with one another to improve the performance of intra prediction in 360-degree video processing.

In accordance with a technique of this disclosure, a video coder (e.g., video encoder 200 or video decoder 300) may determine reference samples for intra prediction for 360° videos with CMP projection and its derivative projections (e.g., adjusted cubemap projection (ACP) and equatorial cylindrical projection (ECP)) based on the location of the current block and a packing structure of the regions of the projection. Selection of reference blocks at the border of a region A that is adjacent to a region B in which there is discontinuity may be based on region A spatially neighboring region B in a sphere domain rather than in the projected domain. In this way, the video coder may select reference samples from blocks in a way that may eliminate discontinuities.

Figure 4A:
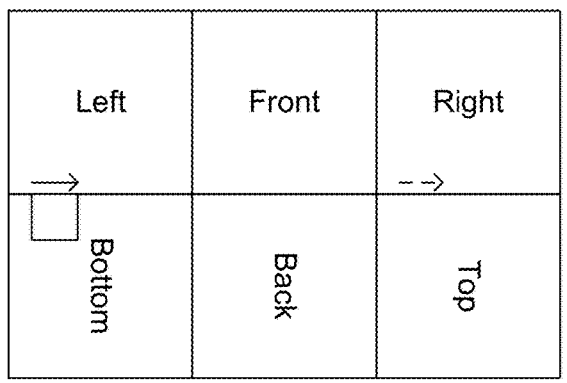
FIG. 4A and FIG. 4B illustrate reference samples used in prior intra prediction processes, reference samples used in an intra prediction process of this disclosure, and the directions of parsing and coding the reference samples.
Figure 4B:
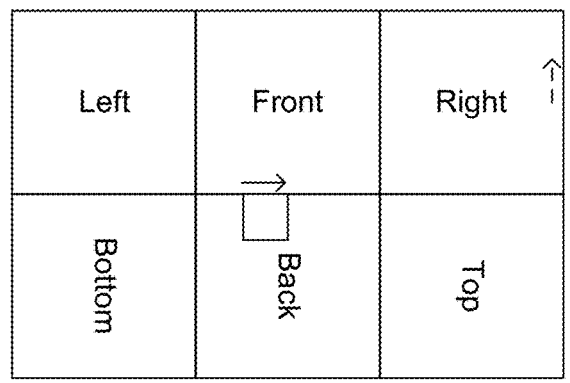

FIG. 4A and FIG. 4B illustrate the above reference samples for a current block that is located at the border of a "bottom" face in a 2×3 packing arrangement. That is, FIG. 4A and FIG. 4B illustrate reference samples used in prior intra prediction processes, reference samples used in an intra prediction process of this disclosure, and the directions of parsing and coding the reference samples. Reference samples determined in accordance with the techniques of this disclosure may not be in the same direction as the samples in the current block. As shown in the example of FIG. 4A, the proposed top reference samples for a current block in the bottom face, which is parsed and coded from left to right, are located at a bottom row of the "right" face and parsed and coded in a direction from left to right. As shown in the example of FIG. 4B, the proposed top reference samples for a current block in the "back" face, which is parsed and coded from left to right, are located at rightmost area of the "right" face and parsed and coded in a direction from bottom to top.

For a 2×3 packing arrangement (such as that shown in FIG. 2B, FIG. 3, FIG. 4A, and FIG. 4B), a video coder may apply the proposed reference sample selection scheme of this disclosure to the blocks as follows:

The first row of blocks in the bottom half of the frame.
The leftmost blocks in the bottom left region of the frame.

For a 3×4 packing arrangement (such as that shown in FIG. 2C), a video coder may apply the proposed reference sample selection of this disclosure to the blocks as follows:

The first row of blocks in the second row of faces of the frame in which their top spatial neighbor is not available.
The leftmost blocks in the bottom left region of the frame.

Figure 5A:
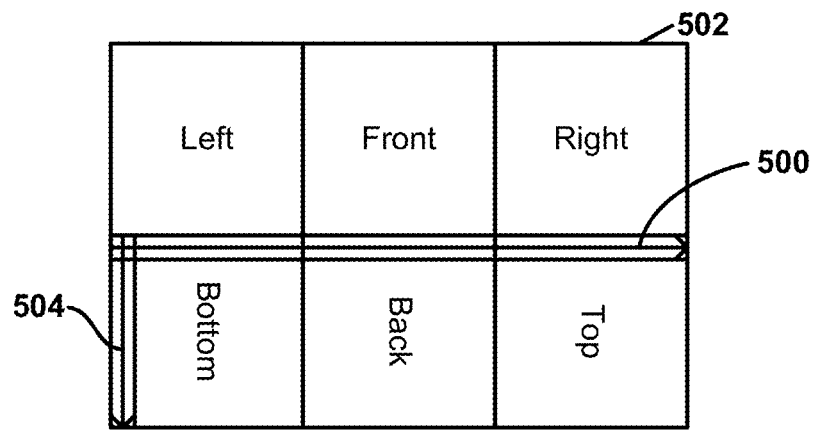
FIG. 5A and FIG. 5B illustrate example areas of blocks where reference sample selection may be applied in accordance with a technique of this disclosure.
Figure 5B:
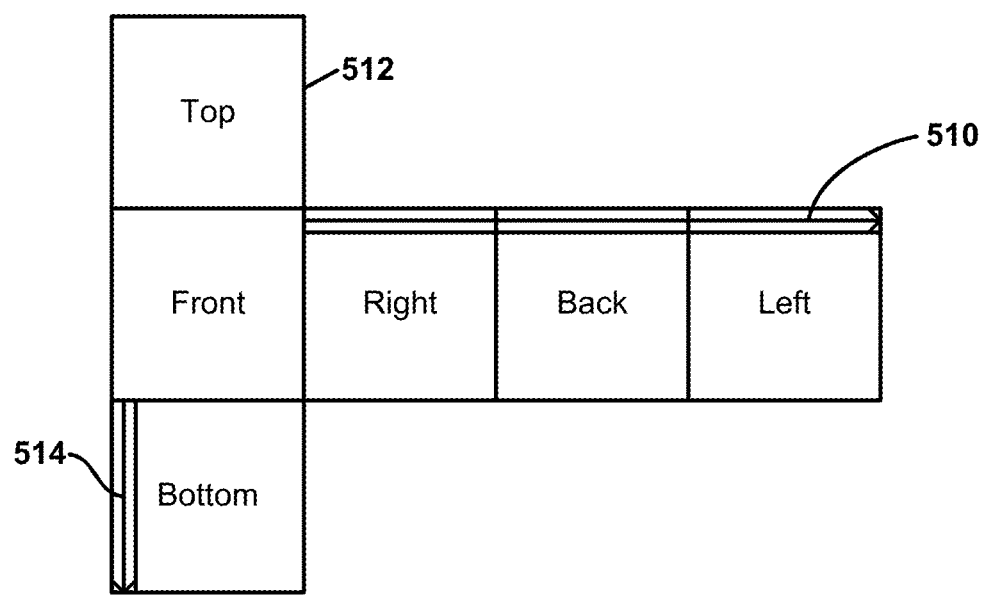
Figure 6A:
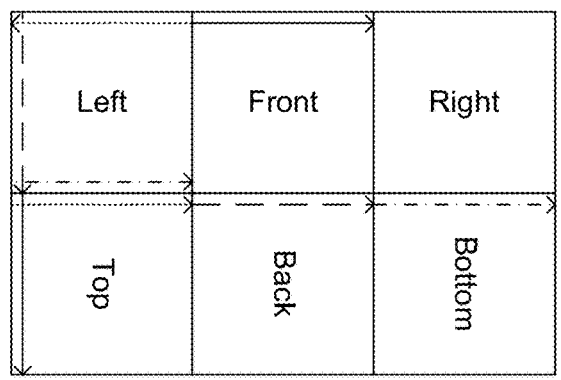
FIGS. 6A-6F illustrate reference sample selection for different types of packing arrangements.
Figure 6B:
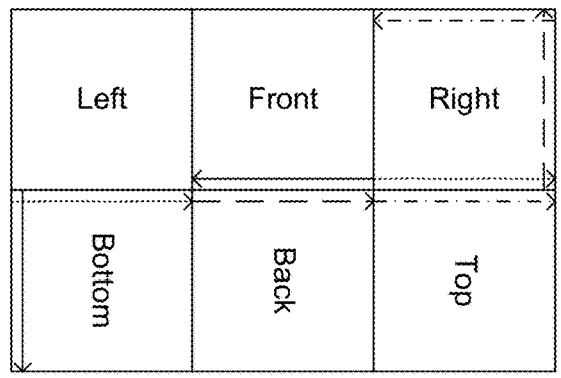
Figure 6C:
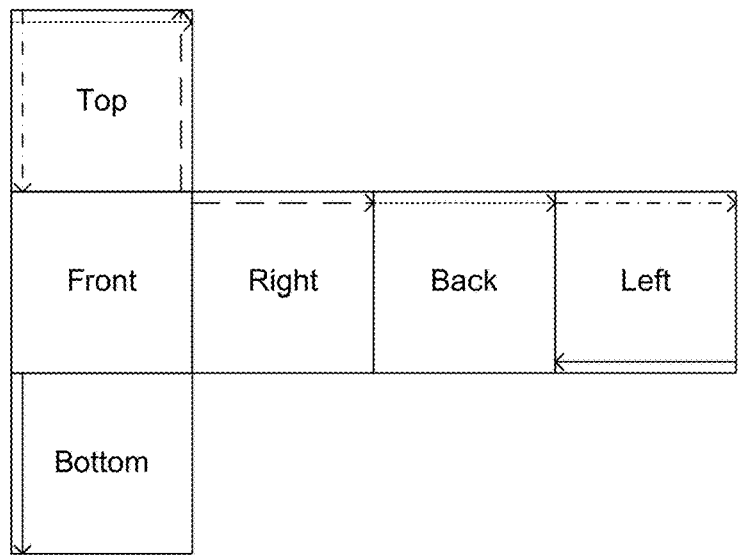
Figure 6D:
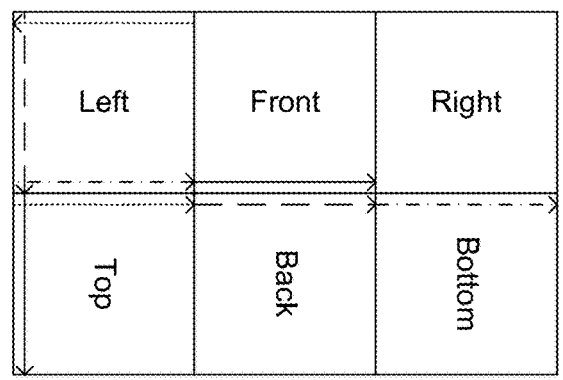
Figure 6E:
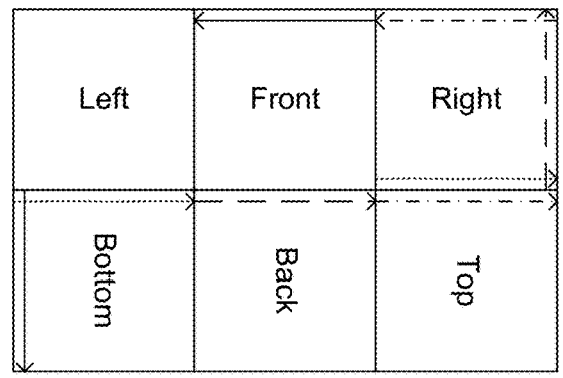
Figure 6F:
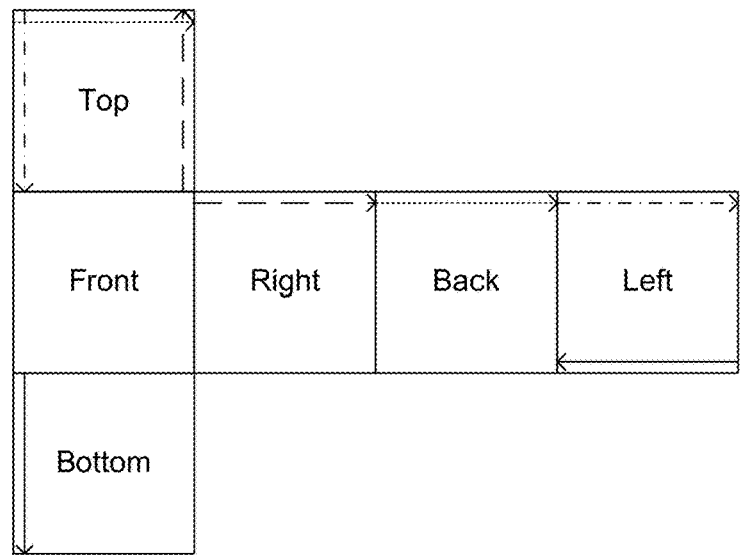

FIG. 5A and FIG. 5B illustrate example areas where reference sample selection of the blocks uses the proposed techniques of this disclosure. In other words, FIG. 5A and FIG. 5B illustrate areas of blocks where the proposed reference sample selection is applied in accordance with a technique of this disclosure. Specifically, in the example of FIG. 5A, arrow 500 indicates that the proposed reference sample selection scheme of this disclosure may be applied to the first row of blocks in the bottom half of frame 502. Arrow 504 indicates that the proposed reference sample selection scheme of this disclosure may be applied to the leftmost blocks in the bottom left region of frame 502. In the example of FIG. 5B, arrow 510 indicates that the proposed reference sample selection scheme of this disclosure may be applied to the first row of blocks in the second row of faces (regions) of frame 512 in which their top spatial neighbors are not available. Arrow 514 indicates that the proposed reference sample selection scheme of this disclosure may be applied to the leftmost blocks in the bottom left region of frame 512.

The proposed reference samples selection depends on the packing arrangement of the projection. FIGS. 6A-6F illustrate non-exhaustive reference samples selection for possible packing arrangements. In other words, FIGS. 6A-6F illustrate reference sample selection for different types of packing arrangements. In FIGS. 6A-6F, corresponding line dash styles indicate corresponding edges. For instance, in the example of FIG. 6A, above reference samples for blocks along the top row of the "top" region are scanned from right to left along a top row of the "left" region; left reference samples for blocks along the left column of the "top" region are scanned from left to right along a top row of the "front" region; above reference samples for blocks along the top row of the "back" region are scanned from top to bottom along a left column of the "left" region; and above reference samples for blocks along the top row of the "bottom" region are scanned from left to right along a bottom row of the "left" region. A similar way of interpreting the arrows applies with respect to FIGS. 6B-6F.

The examples provided above with respect to FIGS. 4A, 4B, 5A, 5B, and 6A-6F disclose selection of reference sample location for blocks located at the border of the projection face. However, distortion is not uniform within a projection face. Thus, given the reference sample location, the actual reference sample value can further be refined by a geometry-based method.

In one example, a video coder (e.g., video encoder 200 or video decoder 300) may perform a reference sample copying method in which the video coder determines the value of a reference sample by copying the value from a location as described above with respect the examples of FIGS. 4A-9D.

Figure 7:
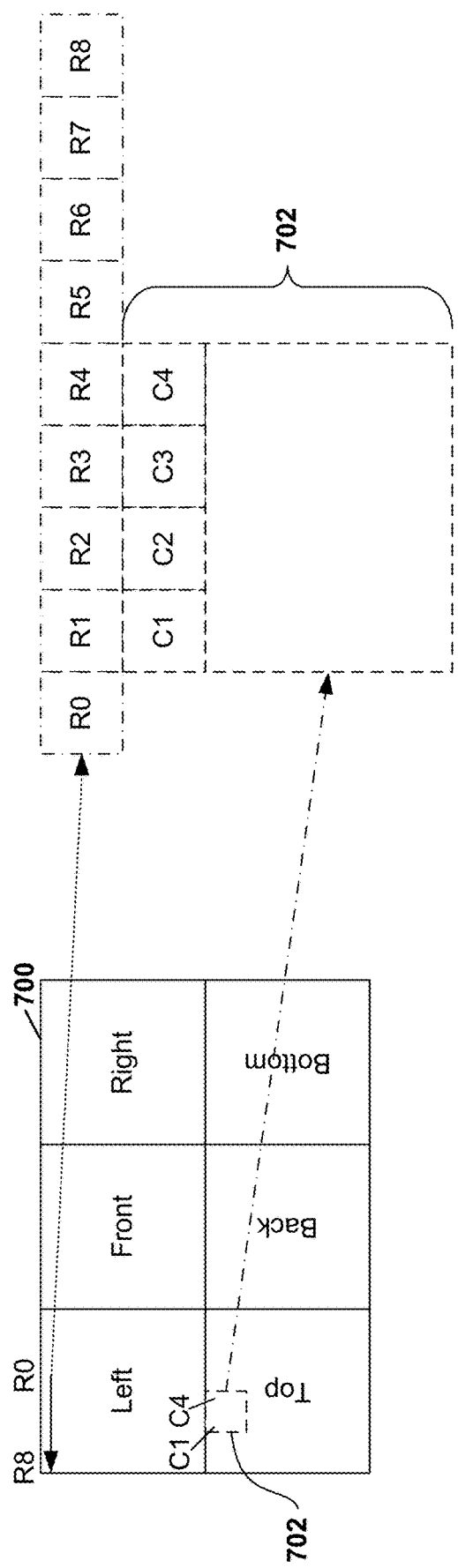
FIG. 7 illustrates an example reference sample copying method in accordance with a technique of this disclosure.

FIG. 7 illustrates an example reference sample copying method in accordance with a technique of this disclosure. In the example of FIG. 7, a "top" region of picture 700 includes a current block 702 that is in a top row of blocks in the "top" region. The top row of current block 702 includes samples C1 through C4. Furthermore, as described with respect to FIG. 6A, the above reference samples selected for blocks in the top row of the "top" region are scanned from right to left along a top row of samples in the "left" region of picture 700. In the example of FIG. 7, the reference samples are labeled R0 through R8.

Figure 8A:
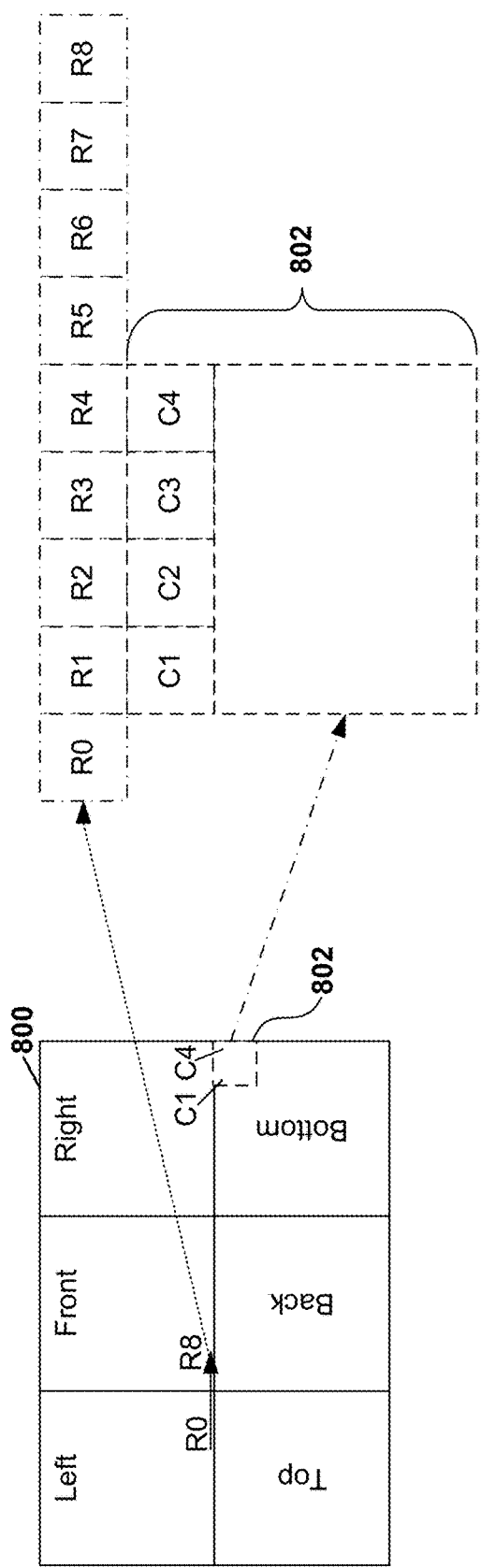
FIG. 8A and FIG. 8B illustrate reference samples for a block at the right-most border.
Figure 8B:
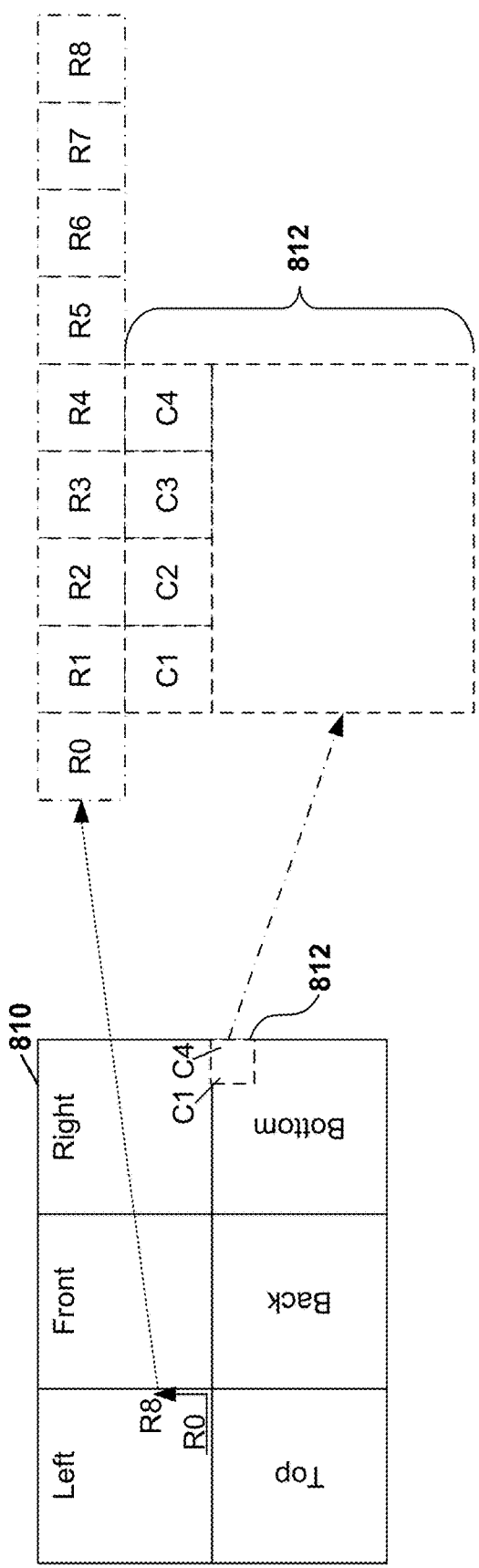

One advantage of using a reference sample copying method is that the reference sample copying method may allow reference samples that are traditionally not available for certain blocks to become available. Two locations of blocks that can benefit from this are the blocks illustrated in FIG. 8A and FIG. 8B. Some of reference samples for the right-most block in the bottom half of the frame typically are not available. However, with the techniques of this disclosure, those reference samples are available and there are two candidate sets can be used as illustrated in FIG. 8A and FIG. 8B. In other words, FIG. 8A and FIG. 8B illustrate reference samples for a block at the right-most border.

FIG. 8A illustrates an example reference sample copying method in accordance with a technique of this disclosure. In the example of FIG. 8A, a "bottom" region of picture 800 includes a current block 802 that is in a top row and a right column of blocks in the "bottom" region. The top row of current block 802 includes samples C1 through C4. Furthermore, as described with respect to FIG. 6A, the above reference samples selected for blocks in the top row of the "bottom" region are scanned from left to right along a bottom row of samples in the "left" region of picture 800 and may continue into the bottom row of samples in the "front" region of picture 800. In the example of FIG. 8A, the reference samples are labeled R0 through R8.

FIG. 8B illustrates an example reference sample copying method in accordance with a technique of this disclosure. In the example of FIG. 8A, a "bottom" region of picture 810 includes a current block 812 that is in a top row and a right column of blocks in the "bottom" region. The top row of current block 812 includes samples C1 through C4. Furthermore, as described with respect to FIG. 6A, the above reference samples selected for blocks in the top row of the "bottom" region are scanned from left to right along a bottom row of samples in the "left" region of picture 810 and may continue up the rightmost column of samples in the "left" region of picture 810. In the example of FIG. 8B, the reference samples are labeled R0 through R8.

Likewise, some of reference samples for the left-bottom-most block in the bottom half of the frame typically are not available. However, with the proposed techniques, those reference samples are available and there are two candidate sets can be used as illustrated in FIGS. 9A-9D. In other words, FIGS. 9A-9D illustrate reference samples for a block at a left-bottom-most border of pictures.

Figure 9A:
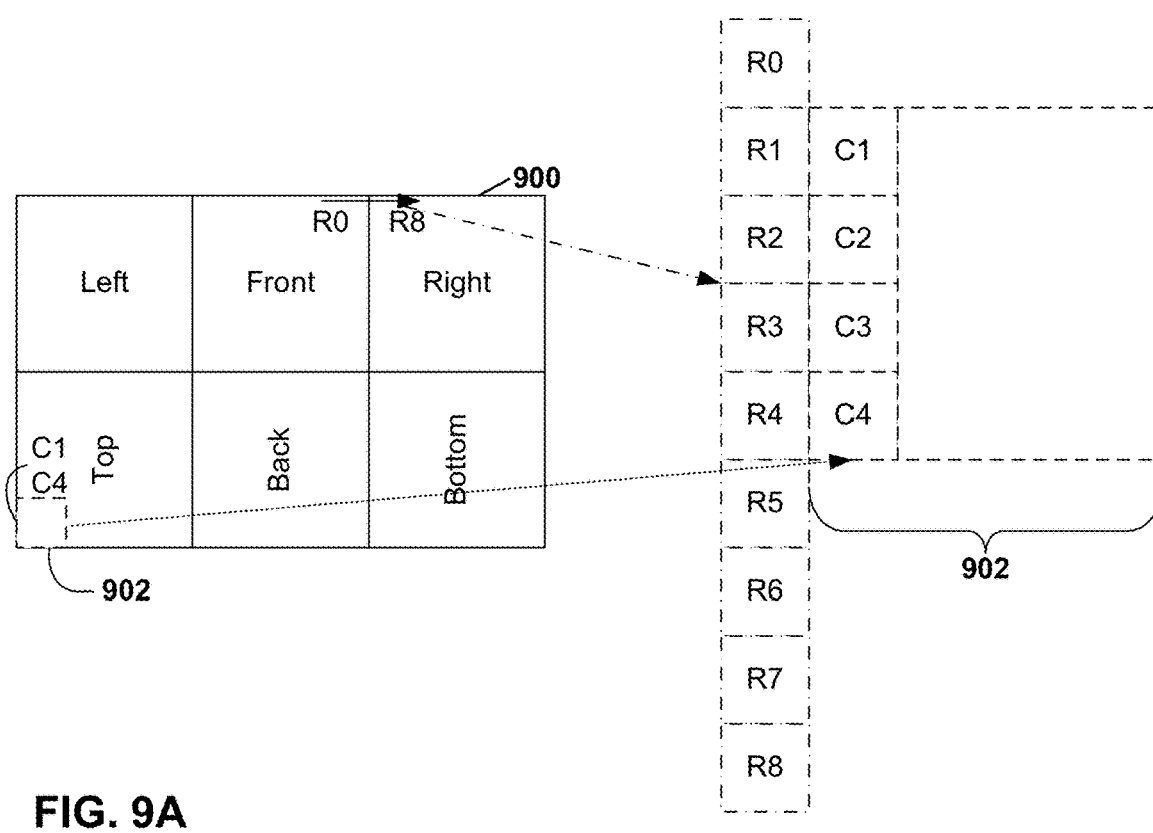
FIG. 9A-FIG. 9D illustrate reference samples for block at the left-bottom-most border.

For instance, in the example of FIG. 9A, a "top" region of a picture 900 includes a current block 902 that is in a bottom row and a left column of blocks in the "top" region. The left column row of current block 902 includes samples C1 through C4. Furthermore, as described with respect to FIG. 6A, the left reference samples selected for blocks in the left column of the "top" region are scanned from left to right along a top row of samples in the "front" region of picture 900 and may continue into the top row of samples in the "right" region of picture 900. In the example of FIG. 9A, the reference samples are labeled R0 through R8.

Figure 9B:
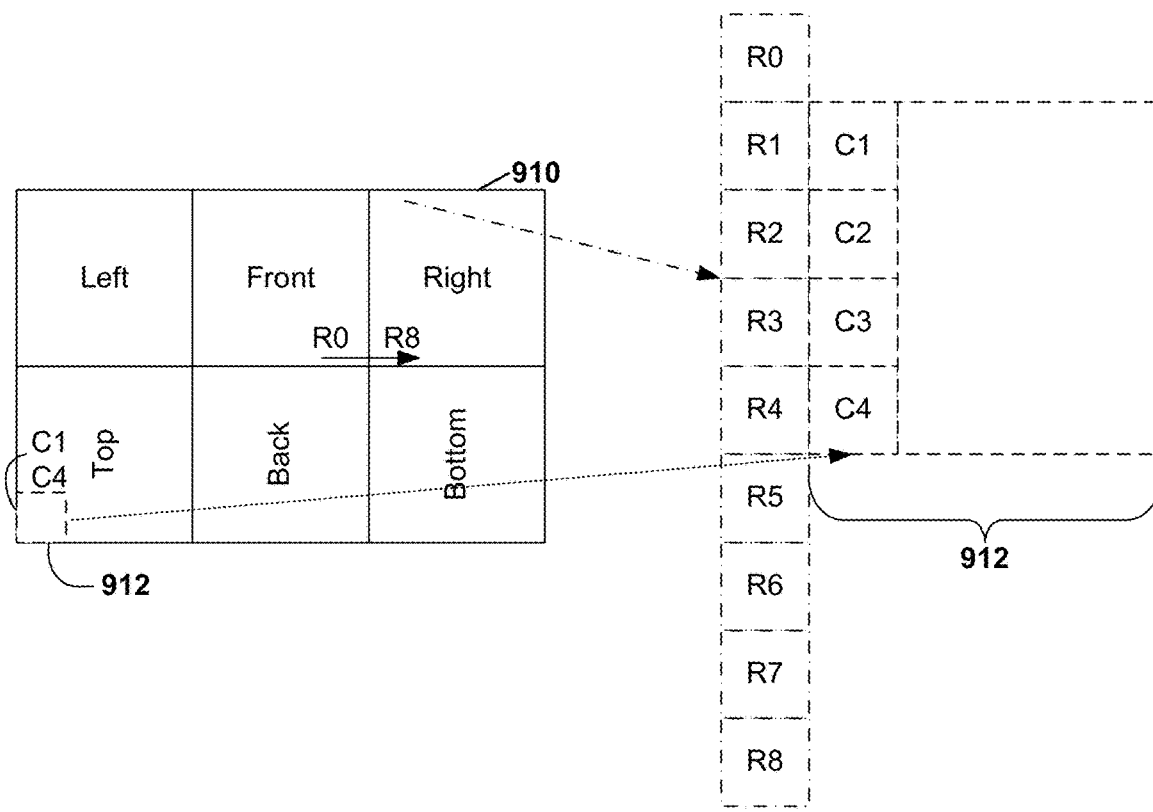

In the example of FIG. 9B, a "top" region of a picture 910 includes a current block 912 that is in a bottom row and a left column of blocks in the "top" region. The left column row of current block 912 includes samples C1 through C4. Furthermore, as described with respect to FIG. 6D, the left reference samples selected for blocks in the left column of the "top" region are scanned from left to right along a bottom row of samples in the "front" region of picture 910 and may continue into the bottom row of samples in the "right" region of picture 910. In the example of FIG. 9B, the reference samples are labeled R0 through R8.

Figure 9C:
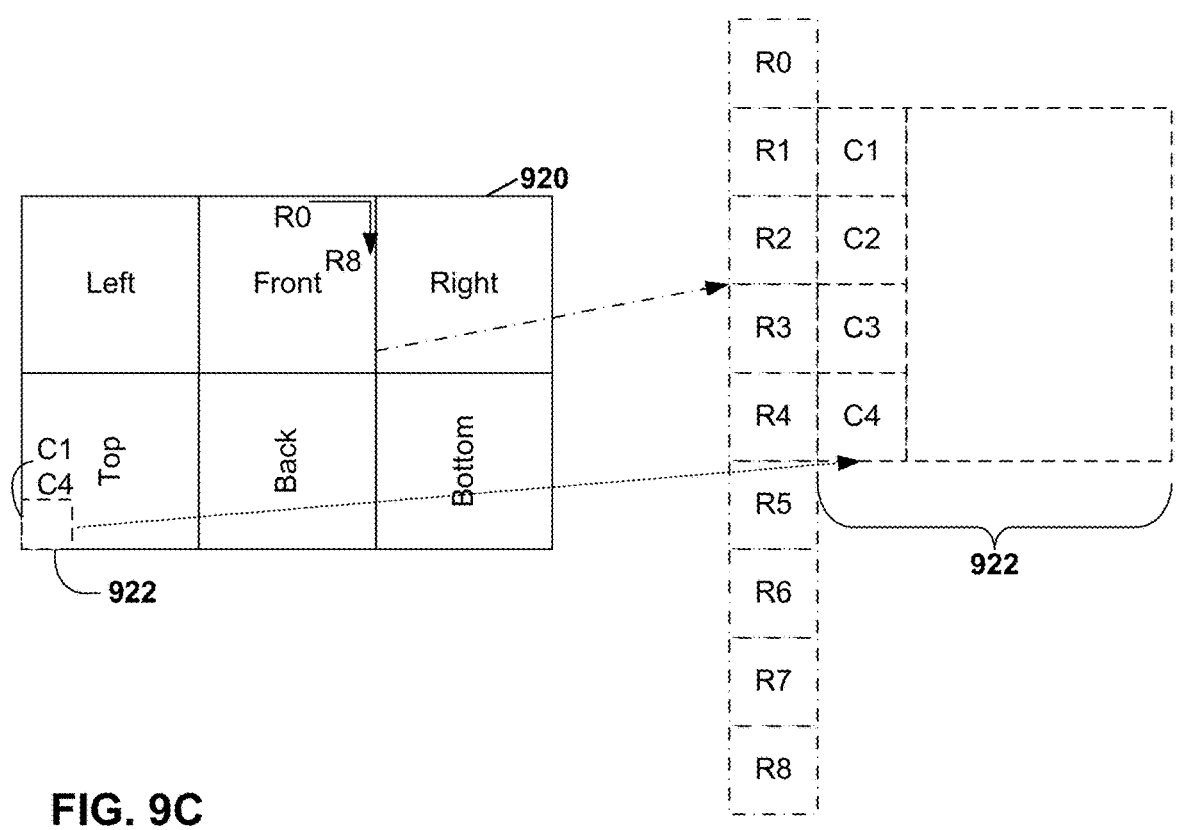

In the example of FIG. 9C, a "top" region of a picture 920 includes a current block 922 that is in a bottom row and a left column of blocks in the "top" region. The left column row of current block 922 includes samples C1 through C4. Furthermore, as described with respect to FIG. 6A, the left reference samples selected for blocks in the left column of the "top" region are scanned from left to right along a top row of samples in the "front" region of picture 900 and may continue down a rightmost column of samples in the "front" region of picture 920. In the example of FIG. 9C, the reference samples are labeled R0 through R8.

Figure 9D:
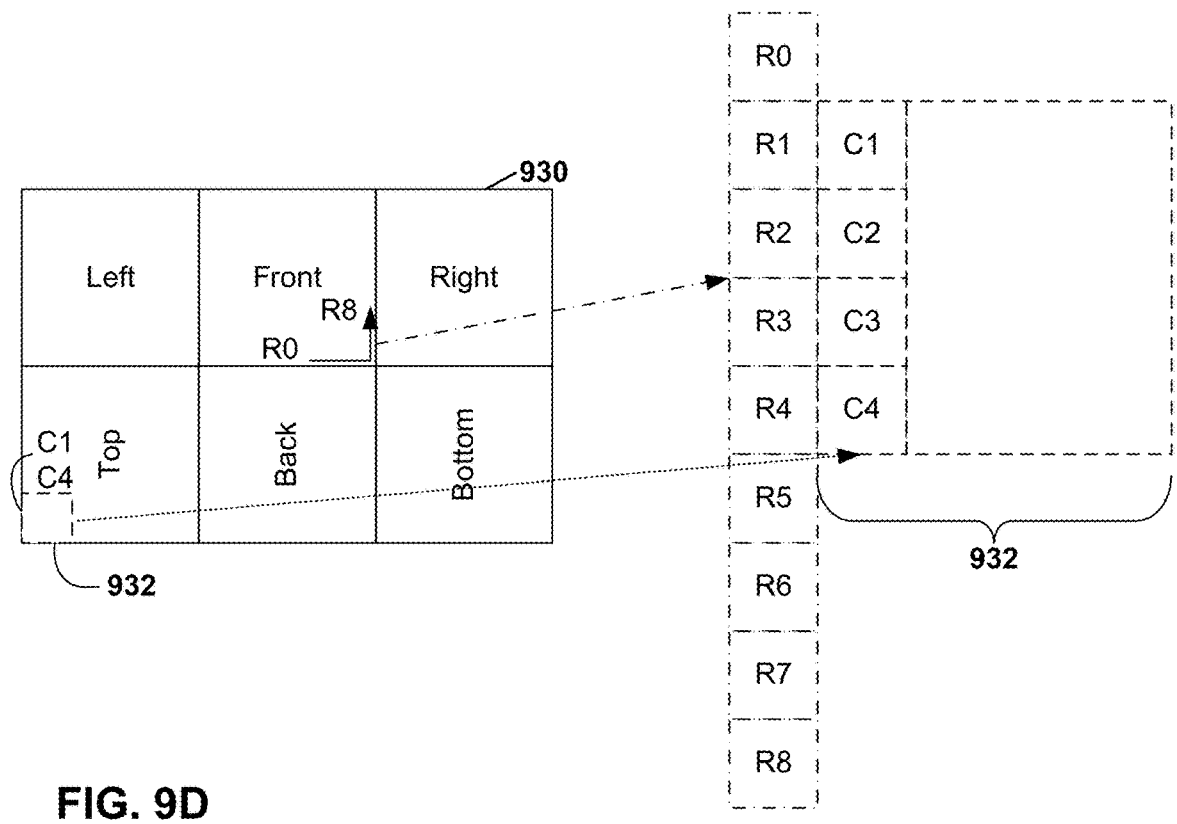

In the example of FIG. 9D, a "top" region of a picture 930 includes a current block 932 that is in a bottom row and a left column of blocks in the "top" region. The left column row of current block 932 includes samples C1 through C4. Furthermore, as described with respect to FIG. 6D, the left reference samples selected for blocks in the left column of the "top" region are scanned from left to right along a bottom row of samples in the "front" region of picture 930 and may continue up a rightmost column of samples in the "front" region of picture 930. In the example of FIG. 9D, the reference samples are labeled R0 through R8.

A second way for a video coder (e.g., video encoder 200 or video decoder 300) to determine the value of a reference sample is by deriving the value based on geometric calculation by considering the location of the reference sample in the face/region. For geometric derivation, the video coder may determine a reference sample location as described elsewhere in this disclosure, e.g., with respect to FIGS. 4A-9D, to determine the associated location on a sphere. Once the video coder locates the location on the sphere, the video coder may then project the location back to the projected picture and the video coder may use the sample value of the projected picture as the final reference sample.

In some examples, a video coder may use the following equations and table to convert between 2D coordinates within a picture and 3D coordinates on a sphere. For instance, dimensions of any of the regions may be denoted as A×A. For 2D-to-3D coordinate conversion, given the position (m, n) in a given region r, and the packing arrangement of FIG. 2B, the video coder may determine (u, v) as:

$$u=(m+0.5)*2/A-1, 0 \le m < A \quad (1)$$

$$v=(n+0.5)*2/A-1, 0 \le n < A \quad (2)$$

The video coder may derive 3D coordinates (X, Y, Z) using the following table given the position (u, v) and the face index r.

| r | X | Y | Z |
|---|---|---|---|
| Front | 1.0 | −v | −u |
| Back | −1.0 | −v | u |
| Top | u | 1.0 | v |
| Bottom | u | −1.0 | −v |
| Left | u | −v | 1.0 |
| Right | −u | −v | −1.0 |

For conversion from 3D coordinates to 2D coordinates, given (X, Y, Z), the (u, v) and region index r is calculated according to the following table. The video coder may then, determine (m, n) on the region solving the Equations (1) and (2).

| Condition | r | u | v |
|---|---|---|---|
| \|X\| ≥ \|Y\| and \|X\| ≥ \|Z\| and X > 0 | Front | −Z/\|X\| | −Y/\|X\| |
| \|X\| ≥ \|Y\| and \|X\| ≥ \|Z\| and X < 0 | Back | Z/\|X\| | −Y/\|X\| |
| \|Y\| ≥ \|X\| and \|Y\| ≥ \|Z\| and Y > 0 | Top | X/\|Y\| | Z/\|Y\| |
| \|Y\| ≥ \|X\| and \|Y\| ≥ \|Z\| and Y < 0 | Bottom | X/\|Y\| | −Z/\|Y\| |
| \|Z\| ≥ \|X\| and \|Z\| ≥ \|X\| and Z > 0 | Left | X/\|Z\| | −Y/\|Z\| |
| \|Z\| ≥ \|X\| and \|Z\| ≥ \|Y\| and Z < 0 | Right | −X/\|Z\| | −Y/\|Z\| |

Figure 10:
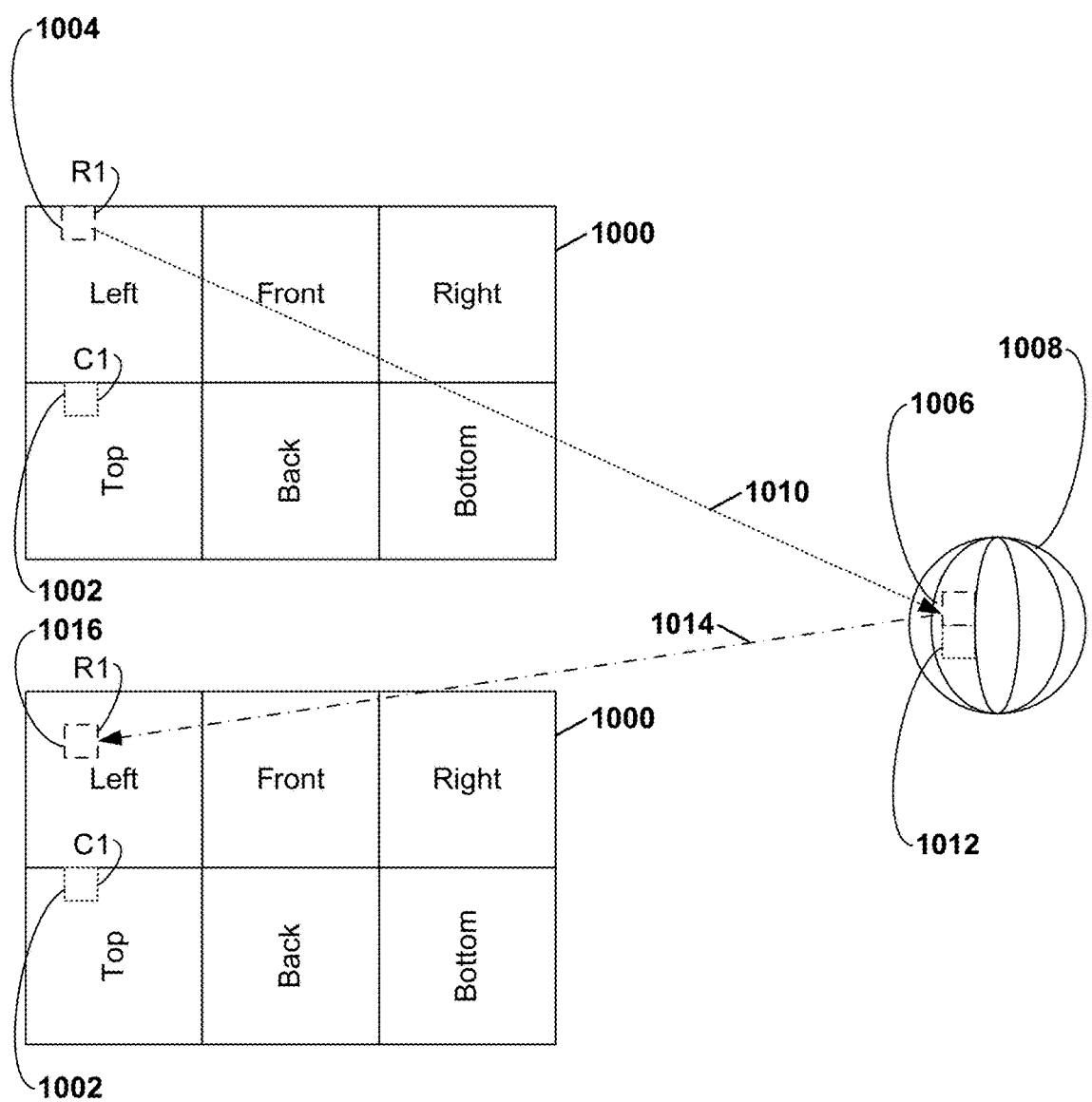
FIG. 10 illustrates an example geometric derivation process for reference samples in accordance with a technique of this disclosure.

FIG. 10 illustrates an example geometric derivation process for reference samples in accordance with a technique of this disclosure. In the example of FIG. 10, a picture 1000 includes a current block 1002. Current block 1002 is labeled "C1" in FIG. 10. Current block 1002 is in the top row of blocks in the "top" region of picture 1000. Consistent with the example of FIG. 6A, the video coder may determine that the above reference samples 1004 for the current block are in the top row of samples of the "left" region of picture 1000. Reference samples 1004 are also marked as "R1" in FIG. 10. This is shown in the upper part of FIG. 10.

Furthermore, in the example of FIG. 10, the video coder may determine a position 1006 of reference samples 1004 on a sphere 1008, as shown by arrow 1010. FIG. 10 also shows a position 1012 of current block 1002 on sphere 1008. The video coder may then project the position 1006 of reference samples 1004 back onto picture 1000, as shown by arrow 1014. When the video coder projects position 1006 back onto picture 1000, the reference samples (R1) are at position 1016 in picture 1000. Note that position 1016 is different from the original position of reference samples 1004. The video coder may use the samples at position 1016 as the above reference samples for current block 1002.

Geometric derivation methods, such as those described with respect to the example of FIG. 10, may enable the video coder to determine better reference sample values, as compared to the simple copying method. However, the geometric derivation methods may have a disadvantage in that the derived reference sample position may be in the area that is not available yet (e.g., an area that is not decoded yet). To handle such a situation, this disclosure proposes to combine the two methods such that geometric derivation method is used, however when the final location of the reference sample is in the unavailable area, the reference sample from copying method is used.

Figure 11:
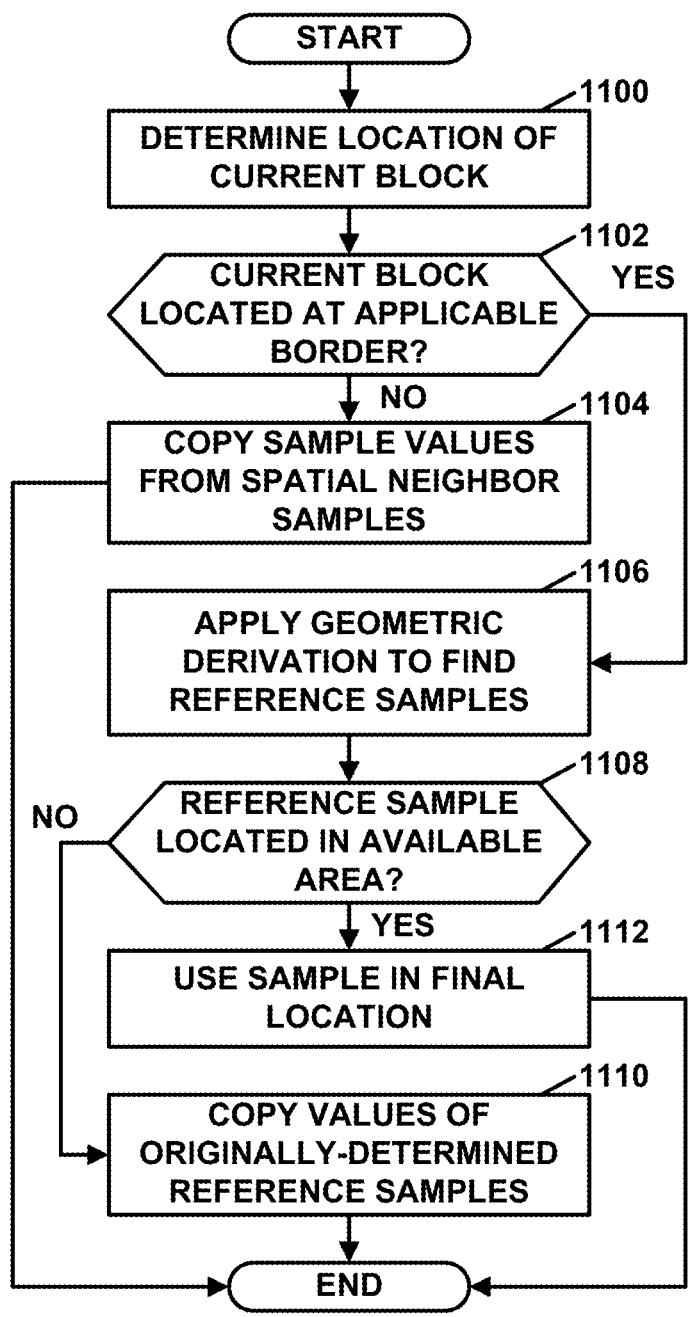
FIG. 11 is a flowchart illustrating an example method for determining reference samples in accordance with a technique of this disclosure.

FIG. 11 is a flowchart illustrating a method for determining reference samples in accordance with a technique of this disclosure. The flowchart of FIG. 11 is one example of a method that combines a geometric derivation method and a copying method.

Particularly, in the example of FIG. 11, a video coder (e.g., video encoder 200 or video decoder 300) may determine a location of a current block (1100). For instance, the video coder may determine x and y coordinates of a corner of the current block. Additionally, the video coder may determine whether the current block is located at an applicable border (1102). For instance, in a 2×3 packing arrangement (such as that shown in FIG. 2B, FIG. 3, FIG. 4A, and FIG. 4B), the current block may be at an applicable border if the current block is in a top row of blocks in the bottom half of the current picture or if the current block is in a leftmost column of blocks in the bottom left region of the current picture. In a 3×4 packing arrangement (such as that shown in FIG. 2C0, the current block may be at an applicable border if the current block is in a first row of blocks in the second row of faces of the current picture in which their top spatial neighbor is not available or if the current block is in a leftmost column of blocks in the bottom left region of the current picture.

In response to determining that the current block is not at an applicable border ("NO" branch of 1102), the video coder may copy the sample value from spatial neighbor samples of the current block (1104). For example, the video coder may use the values of samples in a row of samples above the current block, if available, as the above reference samples for the current block. Additionally, in this example, the video coder may use the values of samples in a column of samples left of the current block, if available, as the left reference samples for the current block. If one or more of the spatial neighbor samples are unavailable, the video coder may determine values of the unavailable spatial neighbor samples in accordance with a variety of techniques known in the art, such as padding, extrapolation, and interpolation. The process of determining reference samples may then end.

However, in response to determining that the current block is at an applicable border ("YES" branch of 1102), the video coder may apply a geometric derivation method to find reference samples (1106). An example of applying a geometric derivation method to find reference samples is described elsewhere in this disclosure, e.g., with respect to FIG. 10.

Furthermore, in the example of FIG. 11, the video coder may determine whether the reference samples found by the geometric derivation method are located in an available area (1108). For instance, in one example, the video coder may determine that the reference samples are unavailable if the reference samples are at locations directly right of the current block, below the current block, below and right of the current block, outside a picture boundary, outside a slice boundary, or outside another type of boundary.

In response to determining that the reference samples found by the geometric derivation method are not in an available area ("NO" branch of 1108), the video coder may copy the values of the originally-determined reference samples without geometric projection (e.g., as described with respect to FIGS. 4A-6D) (1112). The video coder may then end the process of determining values of the reference samples. On the other hand, in response to determining that the reference samples found by the geometric derivation method are in an available area ("YES" branch of 1108), the video coder may use the sample values from the final locations determined by the geometric derivation method (e.g., as described with respect to FIG. 10) (1112). The video coder may then end the process of determining values of the reference samples.

Figure 12:
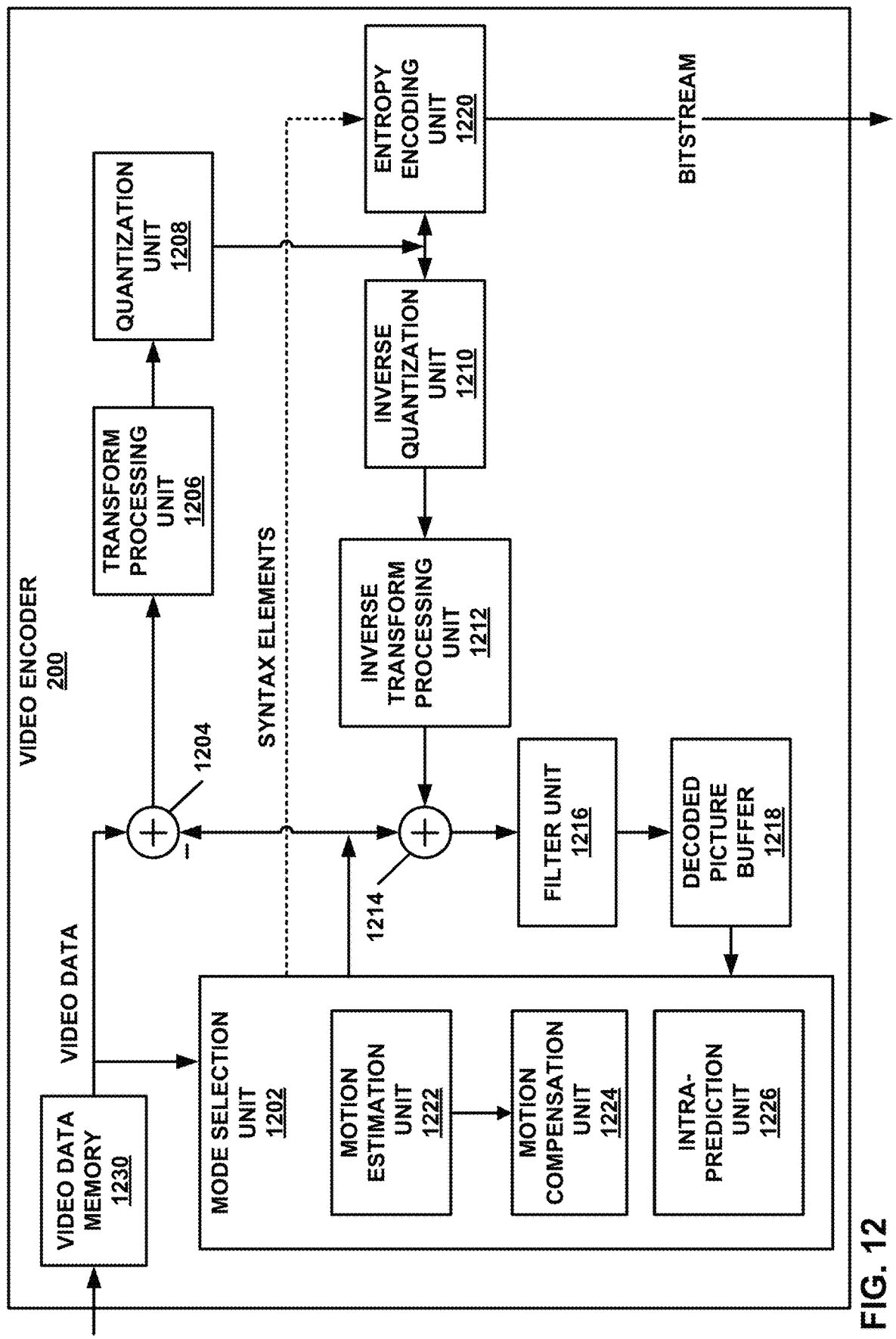
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 12, video encoder 200 includes video data memory 1230, mode selection unit 1202, residual generation unit 1204, transform processing unit 1206, quantization unit 1208, inverse quantization unit 1210, inverse transform processing unit 1212, reconstruction unit 1214, filter unit 1216, decoded picture buffer (DPB) 1218, and entropy encoding unit 1220.

Video data memory 1230 may store video data to be encoded by the components of video encoder 200. Video encoder 200 may receive the video data stored in video data memory 1230 from, for example, video source 104 (FIG. 1). DPB 1218 may act as a reference picture memory that stores reference video data for use in prediction of subsequent video data by video encoder 200. Video data memory 1230 and DPB 1218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 1230 and DPB 1218 may be provided by the same memory device or separate memory devices. In various examples, video data memory 1230 may be on-chip with other components of video encoder 200, as illustrated, or off-chip relative to those components.

In this disclosure, reference to video data memory 1230 should not be interpreted as being limited to memory internal to video encoder 200, unless specifically described as such, or memory external to video encoder 200, unless specifically described as such. Rather, reference to video data memory 1230 should be understood as reference memory that stores video data that video encoder 200 receives for encoding (e.g., video data for a current block that is to be encoded). Memory 106 of FIG. 1 may also provide temporary storage of outputs from the various units of video encoder 200.

Figure 13:
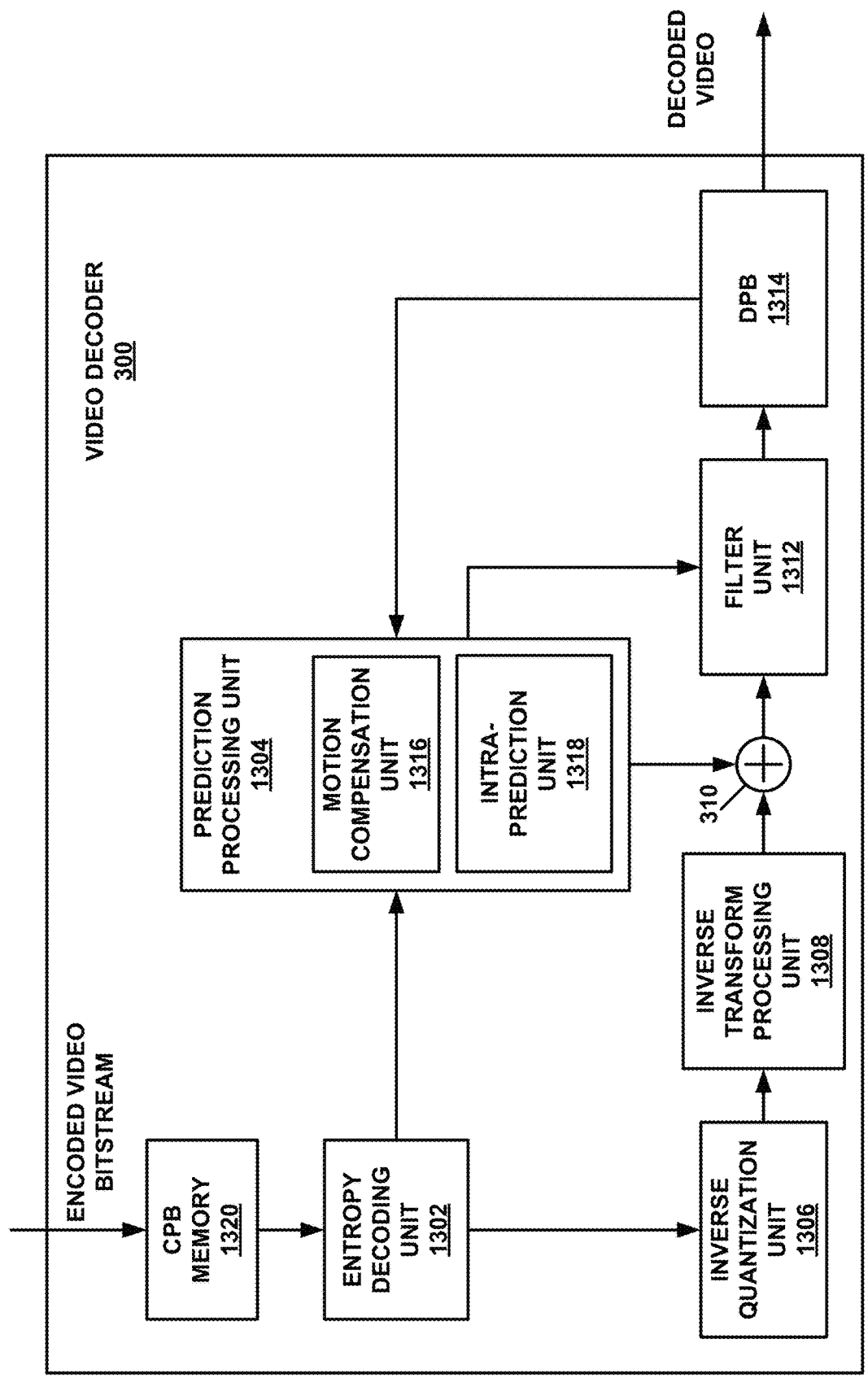
FIG. 13 is a block diagram illustrating an example video decoder that may perform the techniques of this disclosure.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 1230 is configured to store received video data. Video encoder 200 may retrieve a picture of the video data from video data memory 1230 and provide the video data to residual generation unit 1204 and mode selection unit 1202. Video data in video data memory 1230 may be raw video data that is to be encoded.

Mode selection unit 1202 includes a motion estimation unit 1222, motion compensation unit 1224, and an intra prediction unit 1226. Mode selection unit 1202 may include additional functional units to perform video prediction in accordance with other prediction modes. As examples, mode selection unit 1202 may include a palette unit, an intra-block copy unit (which may be part of motion estimation unit 1222 and/or motion compensation unit 1224), an affine unit, a linear model (LM) unit, or the like.

Mode selection unit 1202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 1202 may ultimately select the combination of encoding parameters having rate-distortion values that are better than the other tested combinations.

Video encoder 200 may partition a picture retrieved from video data memory 1230 into a series of CTUs, and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 1202 also controls the components thereof (e.g., motion estimation unit 1222, motion compensation unit 1224, and intra prediction unit 1226) to generate a prediction block for a current block (e.g., a current CU, or in HEVC, the overlapping portion of a PU and a TU). For inter-prediction of a current block, motion estimation unit 1222 may perform a motion search to identify one or more closely matching reference blocks in one or more reference pictures (e.g., one or more previously coded pictures stored in DPB 1218). In particular, motion estimation unit 1222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 1222 may generally perform these calculations using sample-by-sample differences between the current block and the reference block being considered. Motion estimation unit 1222 may identify a reference block having a lowest value resulting from these calculations, indicating a reference block that most closely matches the current block.

Motion estimation unit 1222 may form one or more motion vectors (MVs) that defines the positions of the reference blocks in the reference pictures relative to the position of the current block in a current picture. Motion estimation unit 1222 may then provide the motion vectors to motion compensation unit 1224. For example, for uni-directional inter-prediction, motion estimation unit 1222 may provide a single motion vector, whereas for bi-directional inter-prediction, motion estimation unit 1222 may provide two motion vectors. Motion compensation unit 1224 may then generate a prediction block using the motion vectors. For example, motion compensation unit 1224 may retrieve data of the reference block using the motion vector. As another example, if the motion vector has fractional sample precision, motion compensation unit 1224 may interpolate values for the prediction block according to one or more interpolation filters. Moreover, for bi-directional inter-prediction, motion compensation unit 1224 may retrieve data for two reference blocks identified by respective motion vectors and combine the retrieved data, e.g., through sample-by-sample averaging or weighted averaging.

As another example, for intra prediction, or intra prediction coding, intra prediction unit 1226 may generate the prediction block from samples neighboring the current block. For example, for directional modes, intra prediction unit 1226 may generally mathematically combine values of neighboring samples and populate these calculated values in the defined direction across the current block to produce the prediction block. As another example, for DC mode, intra prediction unit 1226 may calculate an average of the neighboring samples to the current block and generate the prediction block to include this resulting average for each sample of the prediction block.

Mode selection unit 1202 provides the prediction block to residual generation unit 1204. Residual generation unit 1204 receives a raw, unencoded version of the current block from video data memory 1230 and the prediction block from mode selection unit 1202. Residual generation unit 1204 calculates sample-by-sample differences between the current block and the prediction block. The resulting sample-by-sample differences define a residual block for the current block. In some examples, residual generation unit 1204 may also determine differences between sample values in the residual block to generate a residual block using residual differential pulse code modulation (RDPCM). In some examples, residual generation unit 1204 may be formed using one or more subtractor circuits that perform binary subtraction.

In examples where mode selection unit 1202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 1202, via respective units associated with the coding techniques, generates a prediction block for the current block being encoded. In some examples, such as palette mode coding, mode selection unit 1202 may not generate a prediction block, and instead generate syntax elements that indicate the manner in which to reconstruct the block based on a selected palette. In such modes, mode selection unit 1202 may provide these syntax elements to entropy encoding unit 1220 to be encoded.

As described above, residual generation unit 1204 receives the video data for the current block and the corresponding prediction block. Residual generation unit 1204 then generates a residual block for the current block. To generate the residual block, residual generation unit 1204 calculates sample-by-sample differences between the prediction block and the current block.

Transform processing unit 1206 applies one or more transforms to the residual block to generate a block of transform coefficients (referred to herein as a "transform coefficient block"). Transform processing unit 1206 may apply various transforms to a residual block to form the transform coefficient block. For example, transform processing unit 1206 may apply a discrete cosine transform (DCT), a directional transform, a Karhunen-Loeve transform (KLT), or a conceptually similar transform to a residual block. In some examples, transform processing unit 1206 may perform multiple transforms to a residual block, e.g., a primary transform and a secondary transform, such as a rotational transform. In some examples, transform processing unit 1206 does not apply transforms to a residual block.

Quantization unit 216 may quantize the transform coefficients in a transform coefficient block, to produce a quantized transform coefficient block. Quantization unit 216 may quantize transform coefficients of a transform coefficient block according to a quantization parameter (QP) value associated with the current block. Video encoder 200 (e.g., via mode selection unit 1202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 1206.

Inverse quantization unit 1210 and inverse transform processing unit 1212 may apply inverse quantization and inverse transforms to a quantized transform coefficient block, respectively, to reconstruct a residual block from the transform coefficient block. Reconstruction unit 1214 may produce a reconstructed block corresponding to the current block (albeit potentially with some degree of distortion) based on the reconstructed residual block and a prediction block generated by mode selection unit 1202. For example, reconstruction unit 1214 may add samples of the reconstructed residual block to corresponding samples from the prediction block generated by mode selection unit 1202 to produce the reconstructed block.

Filter unit 1216 may perform one or more filter operations on reconstructed blocks. For example, filter unit 1216 may perform deblocking operations to reduce blockiness artifacts along edges of CUs. Operations of filter unit 1216 may be skipped, in some examples.

Video encoder 200 stores reconstructed blocks in DPB 1218. For instance, in examples where operations of filter unit 224 are not needed, reconstruction unit 1214 may store reconstructed blocks to DPB 1218. In examples where operations of filter unit 224 are needed, filter unit 1216 may store the filtered reconstructed blocks to DPB 1218. Motion estimation unit 1222 and motion compensation unit 1224 may retrieve a reference picture from DPB 1218, formed from the reconstructed (and potentially filtered) blocks, to inter-predict blocks of subsequently encoded pictures. In addition, intra prediction unit 1226 may use reconstructed blocks in DPB 1218 of a current picture to intra-predict other blocks in the current picture.

In general, entropy encoding unit 1220 may entropy encode syntax elements received from other functional components of video encoder 200. For example, entropy encoding unit 1220 may entropy encode quantized transform coefficient blocks from quantization unit 1208. As another example, entropy encoding unit 1220 may entropy encode prediction syntax elements (e.g., motion information for inter-prediction or intra-mode information for intra prediction) from mode selection unit 1202. Entropy encoding unit 1220 may perform one or more entropy encoding operations on the syntax elements, which are another example of video data, to generate entropy-encoded data. For example, entropy encoding unit 1220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 1220 may operate in bypass mode where syntax elements are not entropy encoded.

Video encoder 200 may output a bitstream that includes the entropy encoded syntax elements needed to reconstruct blocks of a slice or picture. In particular, entropy encoding unit 1220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra prediction process may be the same for the luma coding blocks and the chroma coding blocks.

Video encoder 200 represents an example of a device configured to encode video data including a memory configured to store video data, and one or more processing units implemented in circuitry and configured to determine, based on a location of a current block of a current picture, reference samples. In this example, the current picture includes a plurality of regions, each respective region of the plurality of regions being a face defined by a projection of 360-degree video data. The projection may be a cubemap projection (CMP) or a derivative projection of the CMP. The regions are arranged in the current picture according to a packing arrangement. Furthermore, in this example, intra prediction unit 1226 of video encoder 200 may generate, based on one or more of the determined reference samples, a prediction block for the current block using intra prediction.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 13, video decoder 300 includes coded picture buffer (CPB) memory 1320, entropy decoding unit 1302, prediction processing unit 1304, inverse quantization unit 1306, inverse transform processing unit 1308, reconstruction unit 1310, filter unit 1312, and decoded picture buffer (DPB) 1314. Prediction processing unit 1304 includes motion compensation unit 1316 and intra prediction unit 1318. Prediction processing unit 1304 may include addition units to perform prediction in accordance with other prediction modes. As examples, prediction processing unit 1304 may include a palette unit, an intra-block copy unit (which may form part of motion compensation unit 1316), an affine unit, a linear model (LM) unit, or the like. In other examples, video decoder 300 may include more, fewer, or different functional components.

CPB memory 1320 may store video data, such as an encoded video bitstream, to be decoded by the components of video decoder 300. The video data stored in CPB memory 1320 may be obtained, for example, from computer-readable medium 110 (FIG. 1). CPB memory 1320 may include a CPB that stores encoded video data (e.g., syntax elements) from an encoded video bitstream. Also, CPB memory 1320 may store video data other than syntax elements of a coded picture, such as temporary data representing outputs from the various units of video decoder 300. DPB 1314 generally stores decoded pictures, which video decoder 300 may output and/or use as reference video data when decoding subsequent data or pictures of the encoded video bitstream. CPB memory 1320 and DPB 1314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 1320 and DPB 1314 may be provided by the same memory device or separate memory devices. In various examples, CPB memory 1320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 1320. Likewise, memory 120 may store instructions to be executed by video decoder 300, when some or all of the functionality of video decoder 300 is implemented in software to executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 1302 may receive encoded video data from the CPB and entropy decode the video data to reproduce syntax elements. Prediction processing unit 1304, inverse quantization unit 1306, inverse transform processing unit 1308, reconstruction unit 1310, and filter unit 1312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 1302 may entropy decode syntax elements defining quantized transform coefficients of a quantized transform coefficient block, as well as transform information, such as a quantization parameter (QP) and/or transform mode indication(s). Inverse quantization unit 1306 may use the QP associated with the quantized transform coefficient block to determine a degree of quantization and, likewise, a degree of inverse quantization for inverse quantization unit 1306 to apply. Inverse quantization unit 1306 may, for example, perform a bitwise left-shift operation to inverse quantize the quantized transform coefficients. Inverse quantization unit 1306 may thereby form a transform coefficient block including transform coefficients.

After inverse quantization unit 1306 forms the transform coefficient block, inverse transform processing unit 1308 may apply one or more inverse transforms to the transform coefficient block to generate a residual block associated with the current block. For example, inverse transform processing unit 1308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 1304 generates a prediction block according to prediction information syntax elements that were entropy decoded by entropy decoding unit 1302. For example, if the prediction information syntax elements indicate that the current block is inter-predicted, motion compensation unit 1316 may generate the prediction block. In this case, the prediction information syntax elements may indicate a reference picture in DPB 1314 from which to retrieve a reference block, as well as a motion vector identifying a location of the reference block in the reference picture relative to the location of the current block in the current picture. Motion compensation unit 1316 may generally perform the inter-prediction process in a manner that is substantially similar to that described with respect to motion compensation unit 1224 (FIG. 13).

As another example, if the prediction information syntax elements indicate that the current block is intra-predicted, intra prediction unit 1318 may generate the prediction block according to an intra prediction mode indicated by the prediction information syntax elements. Again, intra prediction unit 1318 may generally perform the intra prediction process in a manner that is substantially similar to that described with respect to intra prediction unit 1226 (FIG. 12). Intra prediction unit 1318 may retrieve data of neighboring samples to the current block from DPB 1314.

Reconstruction unit 1310 may reconstruct the current block using the prediction block and the residual block. For example, reconstruction unit 1310 may add samples of the residual block to corresponding samples of the prediction block to reconstruct the current block.

Filter unit 1312 may perform one or more filter operations on reconstructed blocks. For example, filter unit 1312 may perform deblocking operations to reduce blockiness artifacts along edges of the reconstructed blocks. Operations of filter unit 1312 are not necessarily performed in all examples.

Video decoder 300 may store the reconstructed blocks in DPB 1314. As discussed above, DPB 1314 may provide reference information, such as samples of a current picture for intra prediction and previously decoded pictures for subsequent motion compensation, to prediction processing unit 1304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine, based on a location of a current block of a current picture, reference samples. In this example, the current picture includes a plurality of regions, each respective region of the plurality of regions being a face defined by a projection of 360-degree video data. The projection may be a cubemap projection (CMP) or a derivative projection of the CMP. The regions are arranged in the current picture according to a packing arrangement. Furthermore, in this example, intra prediction unit 1318 of video decoder 300 may generate, based on one or more of the determined reference samples, a prediction block for the current block using intra prediction.

Figure 14:
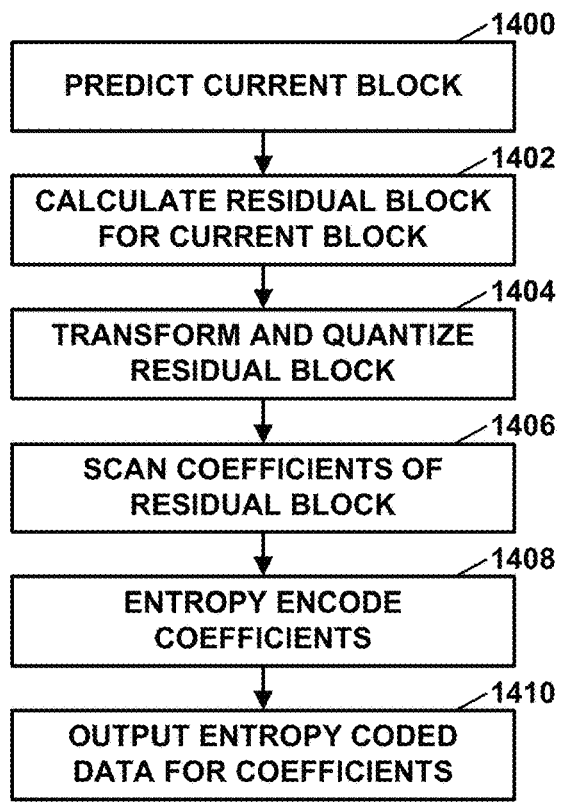
FIG. 14 is a flowchart illustrating an example method for encoding a current block.

FIG. 14 is a flowchart illustrating an example method for encoding a current block. The current block may comprise a current CU. Although described with respect to video encoder 200 (FIGS. 1 and 12), it should be understood that other devices may be configured to perform a method similar to that of FIG. 14.

In this example, video encoder 200 initially predicts the current block (1400). For example, video encoder 200 may form a prediction block for the current block. In some examples, video encoder 200 uses intra prediction to form the prediction block. As part of forming the prediction block using intra prediction, video encoder 200 may determine above reference samples and left reference samples for the current block. In accordance with the techniques of this disclosure, the above and/or left reference samples may correspond to above and/or left reference samples in a cube map projection, but not necessarily in a projected domain (e.g., in the current picture), such as when a packing arrangement causes neighboring faces of a cube map projection to be separated from each other in a projected domain. Thus, video encoder 200 may determine the above and left reference samples for the current block in accordance with any of the techniques and examples of this disclosure, e.g., as explained in greater detail below with respect to FIG. 16.

Video encoder 200 may then calculate a residual block for the current block (1402). To calculate the residual block, video encoder 200 may calculate a difference between the original, unencoded block and the prediction block for the current block. Video encoder 200 may then transform and quantize coefficients of the residual block (1404). Next, video encoder 200 may scan the quantized transform coefficients of the residual block (1406). During the scan, or following the scan, video encoder 200 may entropy encode the coefficients (1408). For example, video encoder 200 may encode the coefficients using CAVLC or CABAC. Video encoder 200 may then output the entropy coded data of the block (1410).

Figure 15:
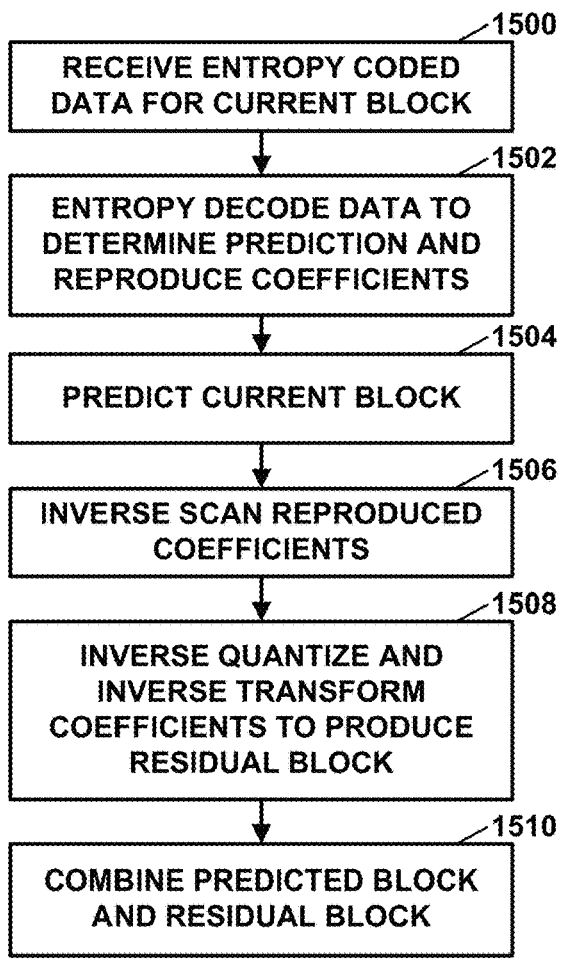
FIG. 15 is a flowchart illustrating an example method for decoding a current block of video data.

FIG. 15 is a flowchart illustrating an example method for decoding a current block of video data. The current block may comprise a current CU. Although described with respect to video decoder 300 (FIGS. 1 and 13), it should be understood that other devices may be configured to perform a method similar to that of FIG. 15.

Video decoder 300 may receive entropy coded data for the current block, such as entropy coded prediction information and entropy coded data for coefficients of a residual block corresponding to the current block (1500). Video decoder 300 may entropy decode the entropy coded data to determine prediction information for the current block and to reproduce coefficients of the residual block (1502).

Video decoder 300 may predict the current block (1504), e.g., using an intra- or inter-prediction mode as indicated by the prediction information for the current block, to calculate a prediction block for the current block. In some examples, video decoder 300 uses intra prediction to form the prediction block. As part of forming the prediction block using intra prediction, video decoder 300 may determine above reference samples and left reference samples for the current block. Video decoder 300 may determine the above and left reference samples for the current block in accordance with any of the techniques and examples of this disclosure.

Video decoder 300 may inverse scan the reproduced coefficients (1506), to create a block of quantized transform coefficients. Video decoder 300 may then inverse quantize and inverse transform the coefficients to produce a residual block (1508). Video decoder 300 may ultimately decode the current block by combining the prediction block and the residual block (1510).

Figure 16:
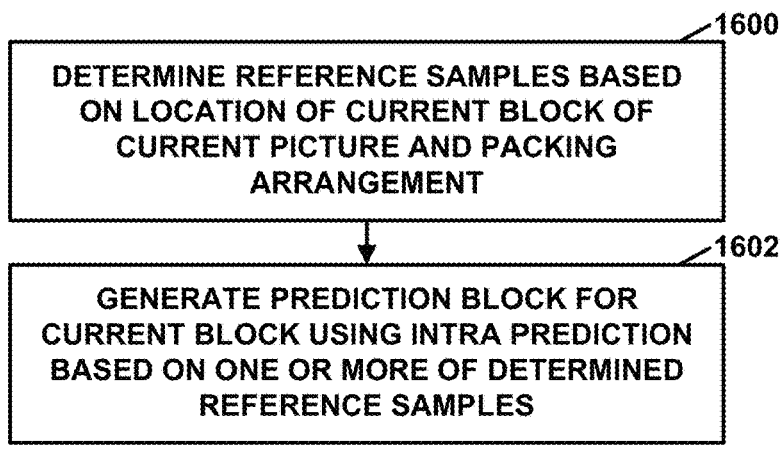
FIG. 16 is a flowchart illustrating an example operation for coding 360-degree video data in accordance with a technique of this disclosure.

FIG. 16 is a flowchart illustrating an example operation for coding 360-degree video data in accordance with a technique of this disclosure. The operation for coding 360-degree video data in FIG. 16 may be part of a process to encode the 360-degree video data or a process to decode the 360-degree video data. The example operation of FIG. 16 may be performed by a video coder, such as video encoder 200 or video decoder 300.

In the example of FIG. 16, the video coder may determine reference samples based on a location of a current block of a current picture of the 360-degree video data and a packing arrangement that defines an arrangement of a plurality of regions in the current picture (1600). In the example of FIG. 16, the current picture is in a projected domain. Each respective region of the plurality of regions is a respective face defined by a projection of 360-degree video data. In the example of FIG. 16, the projection is a cubemap projection (CMP) or a derivative projection of the CMP. Furthermore, the regions include at least a first region and a second region, such as a "bottom" region and a "left" region. The regions are arranged in the current picture according to the packing arrangement, such as those shown in FIG. 2A and FIG. 2B.

Based on the location of the current block being at a border of the first region that is adjacent to the second region and there being a discontinuity at the border due to the packing arrangement, the video coder may determine that the reference samples are samples of the current picture that spatially neighbor the current block in a spherical domain and not in the projected domain. For instance, the video coder may determine the reference samples according to the techniques described in any of FIGS. 4A-9D, FIG. 10, or FIG. 11.

Thus, in some examples, the border of the first region may be adjacent in the projected domain to a border of the second region and the border of the first region is not adjacent in the spherical domain to the border of the second region. For instance, the example of FIG. 4A, the border of the first region (e.g., the "bottom" region of FIG. 4A) is adjacent in the projected domain to a border of the second region (e.g., the "left" region of FIG. 4A) and the border of the first region is not adjacent in the spherical domain to the border of the second region. Rather, in some such examples, the border of the first region is not adjacent in the projected domain to a border of a third region (e.g., the "right" region of FIG. 4A) in the plurality of regions and the reference samples are copies of samples in the third region.

In one example, a block (such as current block 802 of FIG. 8A or current block 812 of FIG. 8B) is a rightmost block in the current picture in the projected domain and is in a lower half of the current picture. In this example, the reference samples that spatially neighbor the block in the spherical domain are each within the current picture. Furthermore, in some examples, a block (such as current block 902 of FIG. 9A, current block 912 of FIG. 9B, current block 922 of FIG. 9C, or current block 932 of FIG. 9D) is a bottom-left-most block in the current picture, and the reference samples that spatially neighbor the block in the spherical domain are each within the current picture.

In accordance with some examples, such as the example of FIG. 10, the video coder may, as part of determining the reference samples in action 1600 of FIG. 16, determine, based on locations of the reference samples, associated locations on a sphere. The video coder may then project the associated locations back to the current picture to determine projected locations. The video coder may then use the projected locations to determine the samples that spatially neighbor the current block in the spherical domain. In other examples, the video coder may copy the reference samples from samples that spatially neighbor the current block in the spherical domain.

In accordance with some examples, such as the example of FIG. 11, when the current block is located at a border of one of the regions (e.g., the border of the first region), the video coder may apply, as part of determining the references samples in action 1600 of FIG. 16, geometric derivation to determine a reference sample location. Furthermore, the video coder may determine a value of a reference sample. When the reference sample location is not in any available area, the reference sample is a copy of a neighboring sample that neighbors the current sample in the spherical domain (e.g., use the described with respect to FIGS. 4A-9D). However, in this example, when the reference sample location is in the available area, the video coder may use a sample at the determined reference sample location as the reference sample. If the current block is not located at a border of any of the regions, the video coder may determine a value of the reference sample as a copy of a sample that spatially neighbors the current block in the projected domain.

Furthermore, in the example of FIG. 16, the video coder may generate a prediction block for the current block using intra prediction based on one or more of the determined reference samples (1602). For instance, the video coder may use a directional or non-directional intra prediction mode that utilizes the reference samples, as described elsewhere in this disclosure. In examples where the operation of FIG. 16 is performed in the context of video encoding, the video coder may generate residual data based on the prediction block and samples of the current block. In examples where the operation of FIG. 16 is performed in the context of video decoding, the video coder may reconstruct samples of the current block based on samples of the prediction block and residual samples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding 360-degree video data, the method comprising:
   determining reference samples based on a location of a current block of a current picture of the 360-degree video data and a packing arrangement that defines an arrangement of a plurality of regions in the current picture, wherein:
      the current picture is in a projected domain,
      each respective region of the plurality of regions is a respective face defined by a projection of 360-degree video data, the projection being a cubemap projection (CMP) or a derivative projection of the CMP, the regions including a first region and a second region,
      the regions are arranged in the current picture according to the packing arrangement,
      based on the location of the current block being at a border of the first region that is adjacent to the second region and there being a discontinuity at the border due to the packing arrangement, the reference samples are samples of the current picture that spatially neighbor the current block in a spherical domain and not in the projected domain, and
      determining the reference samples comprises, based on the current block being located at the border of the first region:
         applying geometric derivation to determine a reference sample location; and
         determining a value of a reference sample, wherein:
            based on the reference sample location not being within any available area, the reference sample is a copy of a neighboring sample that neighbors the current sample in the spherical domain, or
            based on the reference sample location being within an available area, the reference sample is a sample at the reference sample location; and
      generating a prediction block for the current block using intra prediction based on one or more of the determined reference samples.

2. The method of claim 1, wherein coding comprises encoding and the method further comprises generating residual data based on the prediction block and samples of the current block.

3. The method of claim 1, wherein coding comprises decoding and the method further comprises reconstructing samples of the current block based on samples of the prediction block and residual samples.

4. The method of claim 1, wherein the border of the first region is adjacent in the projected domain to a border of the second region and the border of the first region is not adjacent in the spherical domain to the border of the second region.

5. The method of claim 4, wherein the border of the first region is not adjacent in the projected domain to a border of a third region in the plurality of regions, and the reference samples are copies of samples in the third region.

6. The method of claim 4, wherein the current block is a first block and one of the following applies:
   a second block of the current block is a rightmost block in the current picture in the projected domain and is in a lower half of the current picture, and reference samples that spatially neighbor the second block in the spherical domain are each within the current picture, or
   the second block is a bottom-left-most block in the current picture, and the reference samples that spatially neighbor the second block in the spherical domain are each within the current picture.

7. The method of claim 1, wherein determining the reference samples comprises:
   determining, based on locations of the reference samples, associated locations on a sphere;
   projecting the associated locations back to the current picture to determine projected locations; and
   using the projected locations to determine the samples that spatially neighbor the current block in the spherical domain.

8. The method of claim 1, wherein the current block is a first block of the current picture, and the method further comprises:
   based on a second block of the picture not being located at a border of any of the regions, determining a value of a reference sample for the second block as a copy of a sample that spatially neighbors the second block in the projected domain.

9. A device for coding 360-degree video data, the device comprising
   a memory configured to store the 360-degree video data; and
   one or more processors implemented in circuitry, the one or more processors configured to:
      determine reference samples based on a location of a current block of a current picture of the 360-degree video data and a packing arrangement that defines an arrangement of a plurality of regions into the current picture, wherein:

the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain, and the one or more processors are configured such that, based on the current block being located at the border of the first region, the one or more processors:

apply geometric derivation to determine a reference sample location; and determine a value of a reference sample, wherein:
based on the reference sample location not being within any available area, the reference sample is a copy of a neighboring sample that neighbors the current sample in the spherical domain, and
based on the reference sample location being within an available area, the reference sample is a sample at the reference sample location; and generate a prediction block for the current block using intra prediction based on one or more of the determined reference samples.

10. The device of claim 9, wherein coding comprises encoding and the one or more processors are configured to generate residual data based on the prediction block and samples of the current block.

11. The device of claim 9, wherein coding comprises decoding and the one or more processors are configured to reconstruct samples of the current block based on samples of the prediction block and residual samples.

12. The device of claim 9, wherein the border of the first region is adjacent in the projected domain to a border of the second region and the border of the first region is not adjacent in the spherical domain to the border of the second region.

13. The device of claim 12, wherein the border of the first region is not adjacent in the projected domain to a border of a third region in the plurality of regions, and the reference samples are copies of samples in the third region.

14. The device of claim 12, wherein the current block is a first block and one of the following applies:
a second block of the current block is a rightmost block in the current picture in the projected domain and is in a lower half of the current picture, and reference samples that spatially neighbor the second block in the spherical domain are each within the current picture, or
the second block is a bottom-left-most block in the current picture, and the reference samples that spatially neighbor the second block in the spherical domain are each within the current picture.

15. The device of claim 9, wherein the one or more processors are configured such that, as part of determining the reference samples, the one or more processors:
determine, based on locations of the reference samples, associated locations on a sphere;
project the associated locations back to the current picture to determine projected locations; and
use the projected locations to determine the samples that spatially neighbor the current block in the spherical domain.

16. The device of claim 9, wherein the one or more processors are configured such that, as part of determining the reference samples, the one or more processors:
determine, when the current block is not located at a border of any of the regions, a value of the reference sample as a copy of a sample that spatially neighbors the current block in the projected domain.

17. The device of claim 9, further comprising a display configured to display decoded video data.

18. The device of claim 9, wherein the device comprises one or more of a camera, a computer, a mobile device, a broadcast receiver device, or a set-top box.

19. A device for coding video data, the device comprising:
means for determining reference samples based on a location of a current block of a current picture of the 360-degree video data and a packing arrangement that defines an arrangement of a plurality of regions in the current picture, wherein:
the current picture is in a projected domain,
each respective region of the plurality of regions is a respective face defined by a projection of 360-degree video data, the projection being a cubemap projection (CMP) or a derivative projection of the CMP, the regions including a first region and a second region,
the regions are arranged in the current picture according to the packing arrangement,
based on the location of the current block being at a border of the first region that is adjacent to the second region and there being a discontinuity at the border due to the packing arrangement, the reference samples are samples of the current picture that spatially neighbor the current block in a spherical domain and not in the projected domain, and
the means for determining the reference samples comprises, based on the current block being located at the border of the first region:
means for applying geometric derivation to determine a reference sample location; and
means for determining a value of a reference sample, wherein:
based on the reference sample location not being within any available area, the reference sample is a copy of a neighboring sample that neighbors the current sample in the spherical domain, and
based on the reference sample location being within an available area, the reference sample is a sample at the reference sample location; and
means for generating a prediction block for the current block using intra prediction based on one or more of the determined reference samples.

20. A non-transitory computer-readable storage medium having stored thereon instructions that, when executed, cause one or more processors to:
determine reference samples based on a location of a current block of a current picture of the 360-degree video data and a packing arrangement that defines an arrangement of a plurality of regions into the current picture, wherein:

the current picture is in a projected domain, each respective region of the plurality of regions is a respective face defined by a projection of 360-degree video data, the projection being a cubemap projection (CMP) or a derivative projection of the CMP, the regions including a first region and a second region, the regions are arranged in the current picture according to the packing arrangement, based on the location of the current block being at a border of the first region that is adjacent to the second region and there being a discontinuity at the border due to the packing arrangement, the reference samples are samples of the current picture that spatially neighbor the current block in a spherical domain and not in the projected domain, and based on the current block is located at the border of the first region, execution of the instructions causes the one or more processors to:

apply geometric derivation to determine a reference sample location; and determine a value of a reference sample, wherein:

based on the reference sample location not being within any available area, the reference sample is a copy of a neighboring sample that neighbors the current sample in the spherical domain, and based on the reference sample location being within an available area, the reference sample is a sample at the reference sample location; and generate a prediction block for the current block using intra prediction based on one or more of the determined reference samples.

* * * * *